US009350965B2

(12) United States Patent
Lee et al.

(10) Patent No.: US 9,350,965 B2
(45) Date of Patent: May 24, 2016

(54) APPARATUS AND METHOD OF CONTROLLING BRIGHTNESS OF IMAGE

(75) Inventors: Seong-deok Lee, Yongin (KR); Chang-yeong Kim, Guseong-myeon (KR); Yang-seock Seo, Seoul (KR); Yong-in Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1207 days.

(21) Appl. No.: 11/835,907

(22) Filed: Aug. 8, 2007

(65) Prior Publication Data

US 2007/0268222 A1 Nov. 22, 2007

Related U.S. Application Data

(62) Division of application No. 10/291,652, filed on Nov. 12, 2002, now Pat. No. 7,268,753.

(30) Foreign Application Priority Data

Dec. 29, 2001 (KR) .............................. 2001-0088233
Apr. 30, 2002 (KR) .............................. 2002-0023726

(51) Int. Cl.
*G09G 3/30* (2006.01)
*H04N 9/77* (2006.01)
*H04N 9/68* (2006.01)

(52) U.S. Cl.
CPC ... *H04N 9/77* (2013.01); *H04N 9/68* (2013.01)

(58) Field of Classification Search
CPC .................................. H04N 9/77; H04N 9/68
USPC .................................. 345/204; 348/672–678
See application file for complete search history.

(56) References Cited

U.S. PATENT DOCUMENTS 4,086,615 A 4/1978 Koubek
4,489,349 A * 12/1984 Okada ........................... 348/674
(Continued)

FOREIGN PATENT DOCUMENTS

CN 1193867 9/1998
EP 0 430 165 A3 6/1991
(Continued)

OTHER PUBLICATIONS

European Office Action in Application No. 02 257 773.8-1522 dated Nov. 5, 2008.

(Continued)

*Primary Examiner* — Lixi C Simpson
(74) *Attorney, Agent, or Firm* — NSIP Law

(57) ABSTRACT

Provided are an image brightness controlling apparatus and method, and an adaptive brightness controlling apparatus and method based on the brightness degree and/or brightness range of an image. The image brightness controlling apparatus includes a brightness increment arithmetic unit for outputting a brightness increment for a pixel, and an individual component brightness increment arithmetic unit for outputting the brightness increments of individual components constituting the pixel in response to the brightness increment for a pixel. The individual component brightness increment arithmetic unit multiplies the brightness increment of the pixel by each of the unit vectors of the components constituting the pixel to obtain the brightness increments of the individual components. The image brightness controlling apparatus further includes an adder for adding the components constituting the pixel to the brightness increments of the components. The image brightness controlling apparatus and the adaptive image brightness controlling apparatus can maintain the sense of color of an image (e.g., the hue or chroma of an image) while increasing the brightness degree and brightness range of an image.

17 Claims, 21 Drawing Sheets

(56) References Cited

U.S. PATENT DOCUMENTS

| | | | |
|---|---|---|---|
| 4,717,953 A | 1/1988 | Chang et al. | |
| 5,233,410 A | 8/1993 | Fairhurst | |
| 5,818,975 A | 10/1998 | Goodwin et al. | |
| 6,317,519 B2 | 11/2001 | Dusseux | |
| 6,486,889 B1 | 11/2002 | Meyers et al. | |
| 6,646,625 B1 * | 11/2003 | Shigeta et al. | 345/63 |
| 6,664,973 B1 * | 12/2003 | Iwamoto et al. | 345/589 |
| 6,724,934 B1 | 4/2004 | Lee et al. | |

FOREIGN PATENT DOCUMENTS

| | | |
|---|---|---|
| EP | 0 533 100 A2 | 3/1993 |
| EP | 0 533 100 A3 | 3/1993 |
| EP | 0 557 099 | 8/1993 |
| FR | 2575884 | 7/1986 |
| GB | 2194706 | 3/1988 |
| JP | 6-78332 | 3/1994 |
| JP | 7-281633 | 10/1995 |
| JP | 8-317250 | 11/1996 |
| JP | 10-271409 | 10/1998 |
| JP | 2000-115796 | 4/2000 |
| JP | 2000-115799 | 4/2000 |
| JP | 2001-13920 | 1/2001 |
| JP | 2001-119714 | 4/2001 |
| JP | 2001-134226 | 5/2001 |
| JP | 2001-134235 | 5/2001 |
| JP | 2001-229375 | 8/2001 |
| KR | 2001-36456 | 5/2001 |
| KR | 10-2002-0013830 A | 2/2002 |
| WO | 98/51089 | 11/1998 |

OTHER PUBLICATIONS

Office Action mailed Feb. 3, 2009 in corresponding Japanese Patent Application No. 2006-041537 (2 pp.).

Chinese Office Action dated Mar. 7, 2008 (with English Language Translation).

W. K. Pratt, "Idigtal Image Processing", 1978, cover and pp. 307-317, John Wiley & Sons, Inc., United Publishing & Promotion Co., Ltd.

R, C. Gonzalez et al., Digital Image Processing, 1993, cover and pp. 173-179, Addison-Wesley Publishing Company.

Chinese Office Action issued Apr. 1, 2005 in corresponding Chinese Patent Application 02150377.X.

* cited by examiner

APPARATUS AND METHOD OF CONTROLLING BRIGHTNESS OF IMAGE

CROSS-REFERENCE TO RELATED APPLICATIONS

This application claims the benefit of Korean Patent Application Nos. 2001-88233 filed Dec. 29, 2001 and 2002-23726 filed Apr. 30, 2002, in the Korean Intellectual Property Office, and as a divisional application of U.S. application Ser. No. 10/291,652, filed Nov. 12, 2002, the entire contents of which are hereby incorporated by references.

BACKGROUND OF THE INVENTION

1. Field of the Invention

The present invention relates to brightness control circuits, and more particularly, to an image brightness controlling apparatus and method, and an adaptive image brightness controlling apparatus and method based on the brightness degree and/or brightness range of an image, these apparatuses and methods being capable of maintaining the sense of color, such as the original hue (color tone) or chroma, while increasing the brightness of the entire image or part of the image displayed on an image display device, such as a display monitor or a color TV.

2. Description of the Related Art

An image brightness controlling apparatus is a circuit for controlling the brightness of a displayed video image. The image brightness control circuit disclosed in U.S. Pat. No. 4,717,953 applies a direct current (offset) to the red, green, and blue signals constituting an image signal. Accordingly, a conventional image brightness control circuit has a limit in increasing the brightness of an image.

A method of controlling the brightness of an image includes a method of controlling the brightness of an image by applying a gamma function to a luminance signal Y and a method of controlling the brightness of an image by applying a gamma function to each of the red, green, and blue signals (hereinafter, referred to as an RGB signal). In the former method, an RGB signal is divided into a luminance signal Y and two color-difference signals Cb and Cr or I and Q, the brightness of an image is increased by applying a gamma function to the luminance signal Y, and the resultant signals are converted back into the RGB signal.

However, this method may cause a problem in that colors that can be reproduced are out of the color gamut. This gamut problem means that a luminance signal Y with an increased brightness does not have two corresponding color-difference signals. In this case, an increased brightness image does not keep the original hue or/and chroma. This may cause degradation in the quality of image.

In the latter method, a nonlinear involution is applied to each component of an input RGB signal, and accordingly, an output RGB signal has a different ratio, that is, a different direction vector, from the input RGB signal, leading to color variation.

The brightness and contrast of an image can be increased by histogram equalization as presented by W. K. Pratt, in "Digital Image Processing", Wiley, 1978, and R. C. Gonzalez and R. E. Woods, in "Digital Image Processing", Addison-Wesley, 1993. However, in this histogram equalization, the vector direction of an output color may be changed from the vector direction of an input color, which leads to color variation.

SUMMARY OF THE INVENTION

To solve the above-described problems, it is a first object of the present invention to provide an image brightness controlling apparatus and method capable of maintaining the sense of color (e.g., hue, chroma, or the like) of an image while increasing the brightness of an image.

A second object of the present invention is to provide an apparatus for adaptively controlling the brightness of an image according to the brightness degree of the image and a method thereof.

A third object of the present invention is to provide an apparatus for adaptively controlling the brightness of an image according to the brightness range of the image and a method thereof.

To achieve the first object, the present invention provides an image brightness controlling apparatus including a brightness increment arithmetic unit for outputting a brightness increment for a pixel. The image brightness controlling apparatus also includes an individual component brightness increment arithmetic unit for outputting the brightness increments of individual components constituting the pixel in response to the brightness increment for a pixel.

The individual component brightness increment arithmetic unit multiplies the brightness increment of the pixel by each of the unit vectors of the components constituting the pixel to obtain the brightness increments of the individual components. The image brightness controlling apparatus further includes an adder for adding the components constituting the pixel to the brightness increments of the components.

To achieve the first object, the present invention also provides an image brightness controlling apparatus including a brightness arithmetic unit, a reference value arithmetic unit, a brightness increment arithmetic unit, an individual component brightness increment arithmetic unit, and an arithmetic unit. The brightness arithmetic unit outputs the brightness of an input signal. The reference value arithmetic unit outputs a reference brightness for the brightness of an input signal. The brightness increment arithmetic unit outputs a brightness increment corresponding to the difference between the reference brightness and the brightness of the input signal. The individual component brightness increment arithmetic unit calculates the brightness increments of individual elements constituting the input signal in response to the brightness increment for the input signal. The arithmetic unit adds the components constituting the input signal to the brightness increments output from the individual component brightness increment arithmetic unit to obtain a brightness-increased signal.

The individual component brightness increment arithmetic unit multiplies the brightness increment of the input signal by each of the unit vectors of the elements constituting the input signal to obtain the brightness increments of the individual elements.

To achieve the first object, the present invention also provides an image brightness controlling apparatus including a brightness parameter arithmetic unit, a reference value arithmetic unit, a brightness improvement ratio divider, and an individual element multiplier. The brightness parameter arithmetic unit outputs a brightness parameter for an input image signal composed of a plurality of elements. The reference value arithmetic unit outputs a reference brightness value for the output brightness parameter. The brightness improvement ratio divider divides the reference brightness value by the brightness parameter output from the brightness parameter arithmetic unit to obtain a brightness improvement ratio. The individual element multiplier multiplies each of the elements constituting the input image signal by the brightness improvement ratio.

The brightness parameter arithmetic unit determines as the brightness parameter the value of the maximum element among the elements constituting the input image signal.

The reference value arithmetic unit calculates the reference brightness value corresponding to the brightness parameter output from the brightness parameter arithmetic unit using a plurality of reference brightness value functions corresponding to a received control signal.

To achieve the first object of the present invention, there is provided an image brightness controlling method according to an embodiment of the invention. In this method, a brightness increment for a pixel is output, and the brightness increments of individual components constituting the pixel are output in response to the brightness increment for a pixel.

In the step of outputting brightness increments of individual components, the brightness increments of the individual components are obtained by multiplying the brightness increment of the pixel by each of the unit vectors of the components constituting the pixel. The image brightness controlling method further includes adding the components constituting the pixel to the brightness increments of the components.

To achieve the first object of the present invention, there is provided an image brightness controlling method according to another embodiment of the invention. In this method, the brightness of the maximum component among the components constituting an input signal is output. A reference brightness for the brightness of the maximum component is output. The difference between the reference brightness and the brightness of the maximum component is output. A brightness increment corresponding to the brightness difference is output in response to the brightness difference and the components constituting the input signal. The brightness increments of the individual components constituting the input signal are output in response to the components constituting the input signal and the brightness increment received from the brightness increment arithmetic unit. The components constituting the input signal are added to the brightness increments of the components.

To achieve the first object of the present invention, there is provided an image brightness controlling method according to still another embodiment of the invention. In this method, a brightness parameter for an input image signal composed of a plurality of elements is calculated. A reference brightness value for the calculated brightness parameter is calculated. The reference brightness value is divided by the calculated brightness parameter to obtain a brightness improvement ratio. Each of the elements constituting the input image signal is multiplied by the brightness improvement ratio.

In the brightness parameter calculation step, the value of the maximum element among the elements constituting the input image signal is determined as the brightness parameter.

To achieve the second object of the present invention, there is provided an image brightness controlling apparatus depending on the brightness degree of an image. In this apparatus, a brightness improvement parameter setting portion sets a brightness improvement parameter for determining the degree of an increase or decrease in the brightness of an image, in response to an input image signal composed of a plurality of elements and a control signal. A brightness controller controls the brightness of an image in response to the brightness improvement parameter and the input image signal.

The brightness controller includes a brightness parameter arithmetic unit for outputting a brightness parameter for the input image signal; a reference value arithmetic unit for outputting a reference brightness value for the output brightness parameter; a brightness improvement ratio divider for dividing the reference brightness value by the brightness parameter output from the brightness parameter arithmetic unit to obtain a brightness improvement ratio; and an individual element multiplier for multiplying each of the elements constituting the input image signal by the brightness improvement ratio.

The brightness parameter arithmetic unit determines as the brightness parameter the value of the maximum element among the elements constituting the input image signal.

To achieve the second object of the present invention, there is provided an adaptive image brightness controlling method based on the brightness degree of an image. In this method, a brightness improvement parameter for determining the degree of an increase or decrease in the brightness of an image is set in response to an input image signal composed of a plurality of elements and a control signal. Then, the brightness of an image is controlled in response to the brightness improvement parameter and the input image signal.

The brightness controlling step includes: calculating a brightness parameter for the input image signal; calculating a reference brightness value for the output brightness parameter; dividing the reference brightness value by the calculated brightness parameter to obtain a brightness improvement ratio; and multiplying each of the elements constituting the input image signal by the brightness improvement ratio.

In the brightness parameter calculation step, the value of the maximum element among the elements constituting the input image signal is determined as the brightness parameter.

To achieve the third object of the present invention, there is provided an image brightness controlling apparatus depending on the brightness range of an image. In the apparatus, a parameter setting portion sets the maximum and minimum values of the brightness of an input image signal and the maximum and minimum values of an extended brightness in response to the input image signal composed of a plurality of elements and a control signal. A brightness range improving portion outputs a luminance signal obtained by extending the brightness range of the input image signal, in response to the input image signal, the plurality of values output from the parameter setting portion, the predetermined maximum and minimum reference values of the brightness of the input image signal, and the maximum and minimum reference values of an extended brightness.

The brightness range improving portion includes: a brightness parameter arithmetic unit for outputting a brightness parameter for the input image signal; a range comparator for comparing the brightness parameter with the maximum and minimum values of the brightness of the input image signal to determine which section the brightness parameter belongs to and output section information; and a brightness signal arithmetic unit for outputting the brightness range-extended brightness parameter in response to the section information and the brightness parameter.

The brightness parameter arithmetic unit determines as the brightness parameter the value of the maximum element among the elements constituting the input image signal.

To achieve the third object of the present invention, there is provided an adaptive image brightness controlling method depending on the brightness range of an image. In the method, parameters that are the maximum and minimum values of the brightness of an input image signal and the maximum and minimum values of an extended brightness are set in response to the input image signal composed of a plurality of elements and a control signal. The brightness range of the input image signal is extended in response to the input image signal, the plurality of values set in the previous step, the predetermined maximum and minimum reference values of the brightness of the input image signal, and the maximum and minimum reference values of an extended brightness, to obtain a luminance signal whose brightness range is extended.

The features and merits of the present invention will become clear through the following detailed descriptions of preferred embodiments with reference to the accompanying drawings. The terms and words used in the entire specification and the claims must be interpreted as the meanings and concepts conforming to the technical spirit of the present invention based on the principle that the inventor(s) can appropriately define terms in order to explain their invention in the best way.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
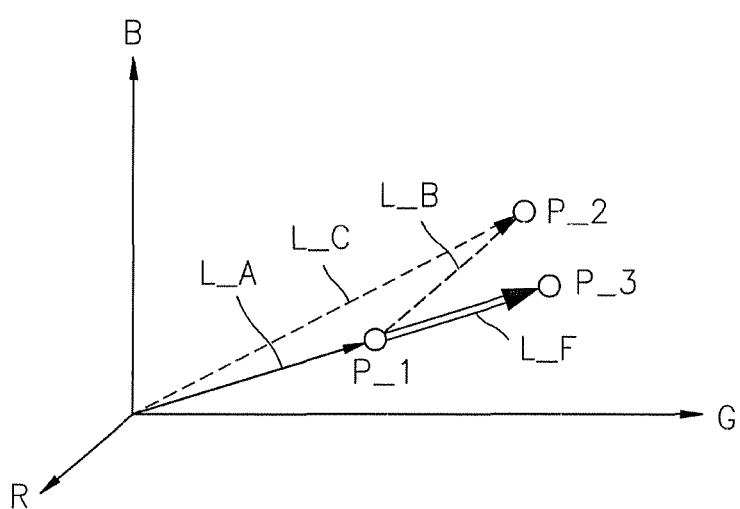
FIG. 1 shows an RGB signal expressed by vectors in an RGB color space.

The present invention will be described more fully hereinafter with reference to the accompanying drawings, in which preferred embodiments of the invention are shown. Like reference numerals refer to the same elements throughout the specification and drawings.

FIG. 1 shows a red (R), green (G), blue (B) signal expressed by vectors in an RGB color space. In FIG. 1, the RGB signal is shown as a vector having a direction and a magnitude in an RGB color space.

Pixels P_1, P_2, and P_3 can be expressed by vectors having magnitudes L_A, L_C and (L_A+L_F), respectively, and directions as shown in FIG. 1. Here, it is assumed that the vector magnitudes L_A, L_C and (L_A+L_F) denote the brightness of the pixels P_1, P_2, and P_3, respectively, and that the directions of the vectors denote the sense of color.

The pixel P_1 is expressed by a vector having the magnitude L_A and a certain direction. Referring to FIG. 1, the vector magnitude of the pixel P_3 is given by L_F and L_A, and the vector direction of the pixel P_3 is the same as the vector direction of the pixel P_1. Accordingly, the brightness of the pixel P_3 is higher than that of the pixel P_1, and the sense of color of the pixel P_3 is the same as that of the pixel P_1. In an image brightness controlling apparatus and method according to the present invention, the pixel P_3 is produced based on the pixel P_1.

However, the magnitude L_C of the pixel P_2 is determined from the magnitude L-A of the pixel P_1, but the direction of the pixel P_2 is different from that of the pixel P_1. Accordingly, the brightness of the pixel P_2 is higher than that of the pixel P_1, but the sense of color of the pixel P_2 is different from that of the pixel P_1. This causes degradation in the quality of image.

Figure 2:
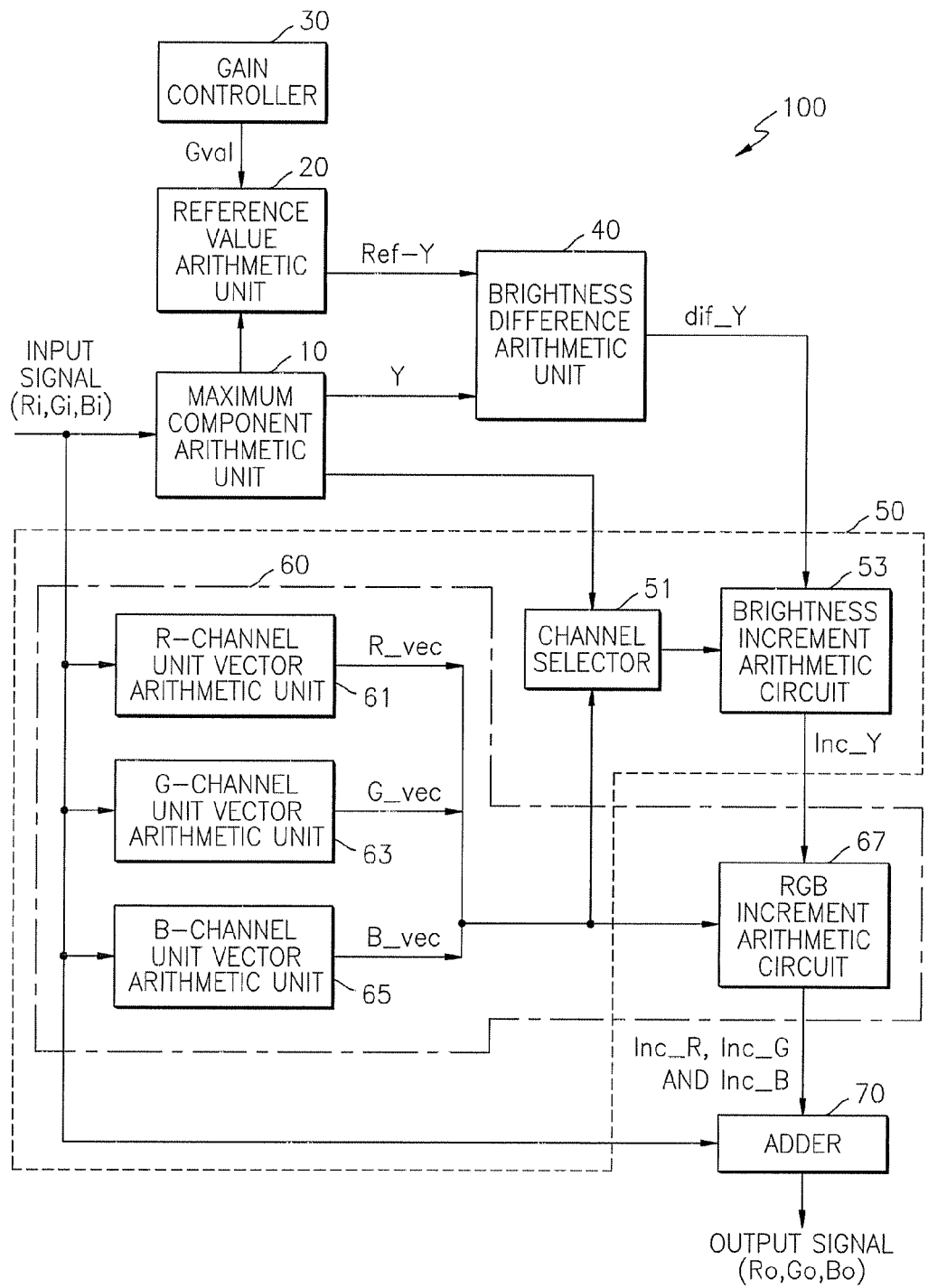
FIG. 2 is a block diagram of an image brightness controlling apparatus according to a first embodiment of the present invention.

FIG. 2 is a block diagram of an image brightness controlling apparatus according to a first embodiment of the present invention. Referring to FIG. 2, an image brightness controlling apparatus 100 includes a maximum component arithmetic unit 10, a reference value arithmetic unit 20, a gain controller 30, a brightness difference arithmetic unit 40, a brightness increment arithmetic unit 50, an RGB increment arithmetic unit 60, and an adder 70.

The brightness increment arithmetic unit 50 includes an R-channel unit vector arithmetic unit 61, a G-channel unit vector arithmetic unit 63, a B-channel unit vector arithmetic unit 65, a channel selector 51, and a brightness increment arithmetic circuit 53. The RGB increment arithmetic unit 60 includes the R-, G-, and B-channel unit vector arithmetic units 61, 63 and 65, and the RGB increment arithmetic circuit 67.

The maximum component arithmetic unit 10 receives three red, green, and blue signals (or components) Ri, Gi, and Bi constituting an input signal (or pixel) and outputs a signal having the maximum value out of the three signals to the reference value arithmetic unit 20, the brightness difference arithmetic unit 40, and the brightness increment arithmetic unit 50. That is, the maximum component arithmetic unit 10 sets the value of the maximum signal out of the red, green, and blue signals Ri, Gi, and Bi constituting an input signal as the brightness Y of the input signal. Hereinafter, Y is referred to as the brightness of the maximum component (signal).

The reference value arithmetic unit 20 calculates a reference brightness Ref_Y corresponding to the maximum component brightness Y output from the maximum component arithmetic unit 10 in response to the output signal Gval of the gain controller 30 and the maximum component brightness Y output from the maximum component arithmetic unit 10, and outputs the same to the brightness difference arithmetic unit 40. The output signal Gval of the gain controller 30 may be controlled by a user. To sum up, the reference value arithmetic unit 20 calculates the reference brightness Ref_Y corresponding to the maximum component brightness Y output from the maximum component arithmetic unit 10. The reference brightness Ref_Y can be calculated using a predetermined lookup table corresponding to the maximum component brightness Y output from the maximum component arithmetic unit 10.

The brightness difference arithmetic unit 40 calculates the brightness difference dif_Y between the reference brightness RefY and the maximum component brightness Y and outputs the brightness difference dif_Y to the brightness increment arithmetic unit 50. That is, the brightness difference arithmetic unit 40 outputs the brightness difference dif_Y between the brightness Y of the original input signal and the reference brightness Ref_Y.

In response to the input signal, the maximum component brightness Y output from the maximum component arithmetic unit 10, and the brightness difference dif_Y output from the brightness difference arithmetic unit 40, the brightness increment arithmetic unit 50 calculates a brightness increment Inc_Y of the maximum component brightness Y and outputs the same to the RGB increment arithmetic unit 60.

The RGB increment arithmetic unit 60 calculates R, G, and B increments Inc_R, Inc_G, and Inc_B with respect to the respective R, G and B components in response to the input signal and the brightness increment Inc_Y output from the brightness increment arithmetic unit 50, and outputs the R, G, and B increments Inc_R, Inc_G, and Inc_B to the adder 70. The R, G, and B increments Inc_R, Inc_G, and Inc_B are obtained by multiplying the brightness increment Inc_Y output from the brightness increment arithmetic unit 50 by each of R, G and B unit vectors constituting the input signal.

The adder 70 adds the R, G and B signals constituting the input signal to the R, G, and B increments Inc_R. Inc_G, and Inc_B output from the RGB increment arithmetic unit 60 in order to obtain output signals Ro, Go, and Bo.

The R-, G-, and B-channel unit vector arithmetic units 61, 63 and 65 calculate the unit vectors R_vec, G_vec, and B_vec of the red, green and blue signals Ri, Gi and Bi, respectively, received via R, G, and B channels, respectively, and output the same to the channel selector 51 and the RGB increment arithmetic circuit 60. The channel selector 51 selects one among the unit vectors R_vec, G_vec, and B_vec output from the R-, G-, and B-channel unit vector arithmetic units 61, 63 and 65 and outputs a selected unit vector to the brightness increment arithmetic circuit 53. Preferably, the channel selector 51 outputs the maximum unit vector.

The brightness increment arithmetic circuit 53 multiplies the output signal of the channel selector 51 by the brightness difference dif_Y output from the brightness difference arithmetic unit 40 and outputs the product of the multiplication to the RGB increment arithmetic circuit 67. The RGB increment arithmetic circuit 67 multiplies the brightness increment Inc_Y output from the brightness increment arithmetic circuit 53 by each of the unit vectors R_vec, G_vec, and B_vec output from the R-, G-, and B-channel unit vector arithmetic units 61, 63 and 65, respectively, and outputs the products Inc_R, Inc_G, and Inc_B to the adder 70.

Figure 3:
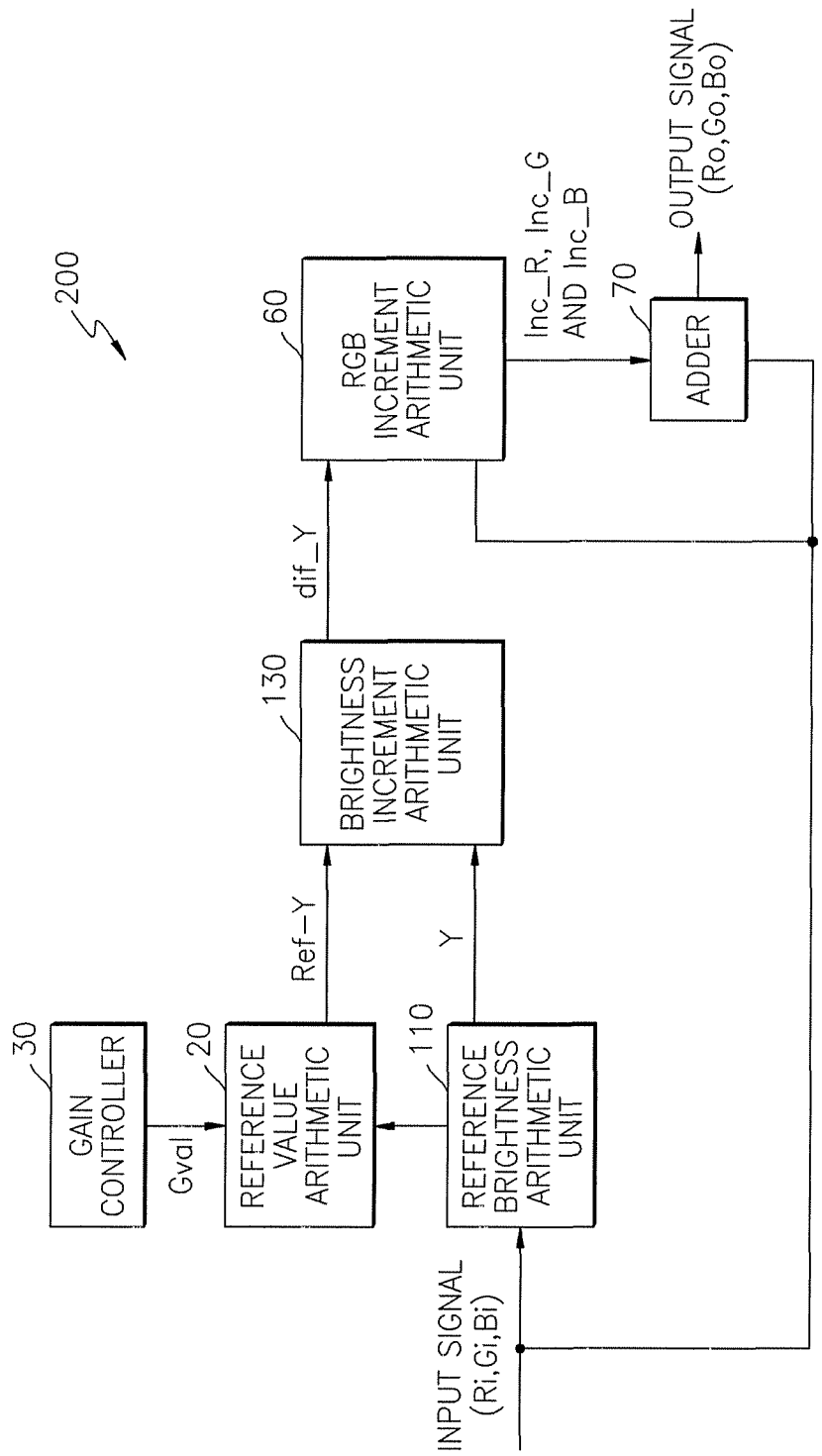
FIG. 3 is a block diagram of an image brightness controlling apparatus according to a second embodiment of the present invention.

FIG. 3 is a block diagram of an image brightness controlling apparatus according to a second embodiment of the present invention. An image brightness controlling apparatus 200 in FIG. 3 includes a reference value arithmetic unit 20, a gain controller 30, a brightness arithmetic unit 110, a brightness increment arithmetic unit 130, an RGB increment arithmetic unit 60, and an adder 70. Since the image brightness controlling apparatus 200 of FIG. 3 is similar to the image brightness controlling apparatus 100 of FIG. 2, only the brightness arithmetic unit 110 and the brightness increment arithmetic unit 130 will now be described.

The brightness arithmetic unit 110 calculates the brightness Y of an input signal composed of R, G and B signals Ri, Gi and Bi and outputs the same to the reference value arithmetic unit 20 and the brightness increment arithmetic unit 130. The brightness increment arithmetic unit 130 calculates the brightness difference dif_Y between the reference brightness Ref_Y output from the reference value arithmetic unit 20 and the brightness Y output from the brightness arithmetic unit 110 and outputs the brightness difference dif_Y to the RGB increment arithmetic unit 60. In this embodiment, the brightness difference dif_Y is the same as the brightness increment Inc_Y.

The RGB increment arithmetic unit 60 calculates R, G, and B increments Inc_R, Inc_G, and Inc_B in response to R, G and B signals Ri, Gi, and Bi constituting an input signal and the brightness difference dif_Y output from the brightness increment arithmetic unit 130, and outputs the same to the adder 70. The adder 70 adds the received R, G and B signals Ri, Gi, and Bi to the R, G, and B increments Inc_R, Inc_G, and Inc_B output from the RGB increment arithmetic unit 60 to obtain output signals Ro, Go, and Bo.

Figure 4:
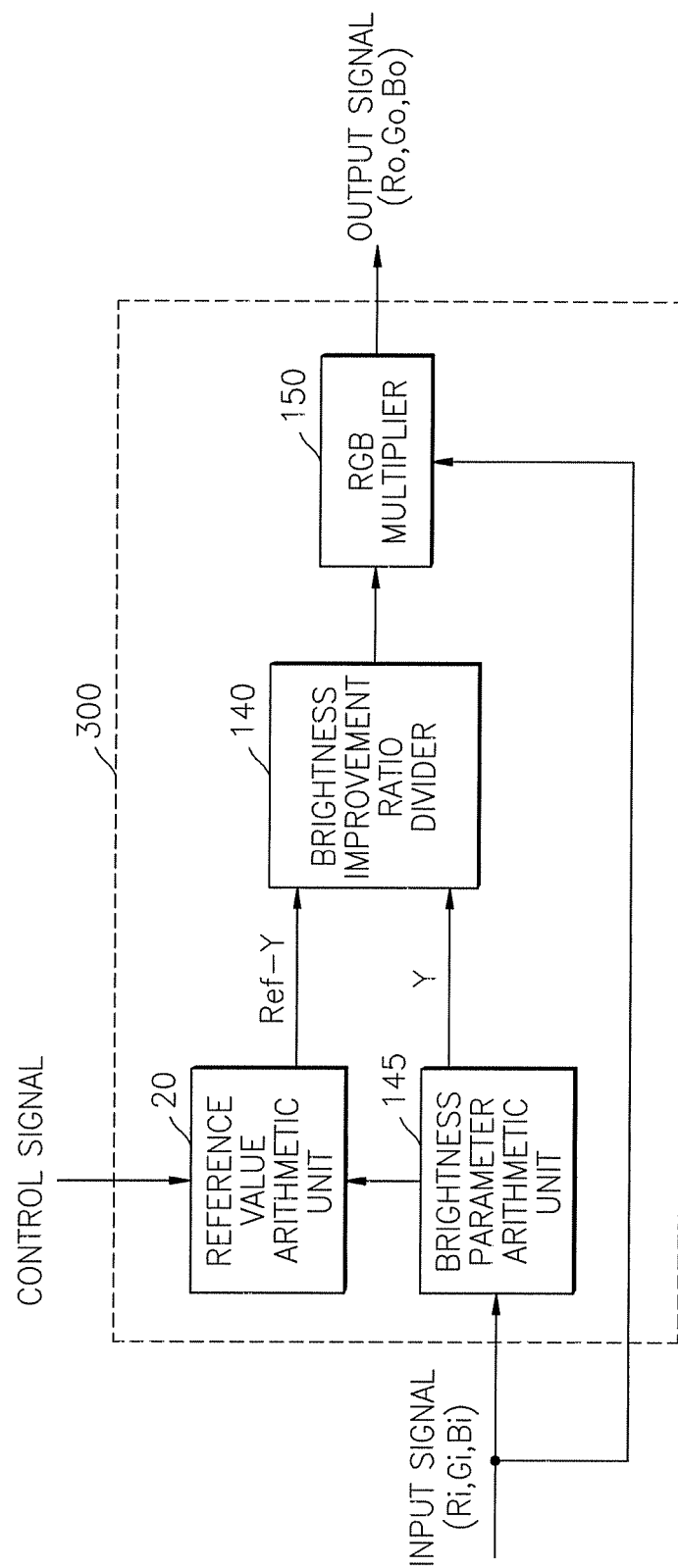
FIG. 4 is a block diagram of an image brightness controlling apparatus according to a third embodiment of the present invention.

FIG. 4 is a block diagram of an image brightness controlling apparatus according to a third embodiment of the present invention. An image brightness controlling apparatus 300 of FIG. 4 includes a brightness parameter arithmetic unit 145, a reference value arithmetic unit 20, a brightness improvement ratio divider 140, and an RGB multiplier 150.

The brightness parameter arithmetic unit 145 receives an image signal (Ri, Gi, and Bi), determines the brightness parameter of the received image signal, and outputs the same to the reference value arithmetic unit 20 and the brightness improvement ratio divider 140. The brightness parameter can be determined by a plurality of methods. For example, the maximum value out of three components Ri, Gi, and Bi constituting the received image signal can be determined as the brightness parameter.

The reference value arithmetic unit 20 is the same as the reference value arithmetic unit described above, so it will not be described in detail.

The brightness improvement ratio divider 140 receives the reference brightness value from the reference value arithmetic unit 20 and the brightness parameter from the brightness parameter arithmetic unit 145, makes the ratio of the two received values, and outputs the result to the RGB multiplier 150. The RGB multiplier 150 multiplies each of the input image signal components Ri, Gi, and Bi by the brightness improvement ratio received from the brightness improvement ratio divider 140 to obtain a brightness-improved signal composed of components Ro, Go and Bo.

Figure 5:
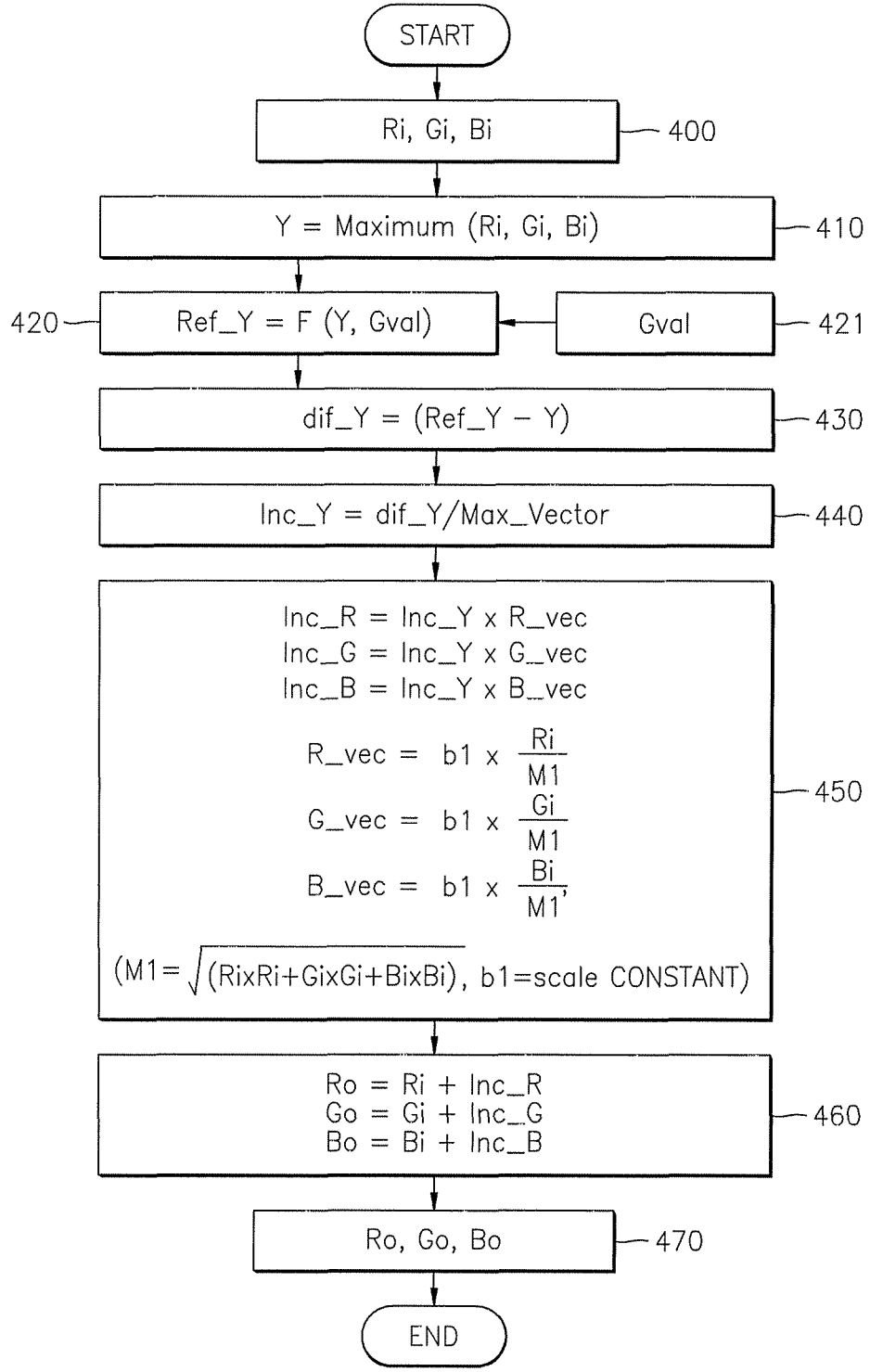
FIG. 5 is a flowchart for illustrating an image brightness controlling method according to the first embodiment of the present invention.

FIG. 5 is a flowchart for illustrating an image brightness controlling method according to a first embodiment of the present invention. In the image brightness controlling method with reference to FIGS. 1, 2, and 5, first of all, the maximum component arithmetic unit 10 receives an image signal (or pixel) composed of a red signal Ri, a green signal Gi, and a blue signal Bi, in step 400. Thereafter, the maximum component arithmetic unit 10 obtains a maximum signal out of the red signal Ri, the green signal Gi, and the blue signal Bi using Equation 1, in step 410:

$$Y = \text{Maximum (Ri, Gi, Bi)} \qquad (1)$$

wherein Y denotes a maximum value out of the three values of the signals Ri, Gi, and Bi constituting an input signal (or pixel). The maximum component arithmetic unit 10 outputs the brightness Y of the maximum signal (or component) to the reference value arithmetic unit 20, the brightness difference arithmetic unit 40, and the brightness increment arithmetic unit 50.

In response to the output signal Gval of the gain controller 30 in step 421, the reference value arithmetic unit 20 calculates the reference brightness Ref_Y corresponding to the brightness Y of the input signal or maximum signal (or component) using Equation 2 and outputs the same to the brightness difference arithmetic unit 40, in step 420. Equation 2 is as follows:

$$\text{Ref}\_Y = F(Y, \text{Gval}) \qquad (2)$$

wherein F(Y,·) denotes a function of the brightness Y of the maximum signal (or component) expressed in Equation 1. In other words, the reference brightness Ref_Y is determined by the brightness Y of the maximum signal (or component) and the output signal Gval of the gain controller 30.

Figure 8:
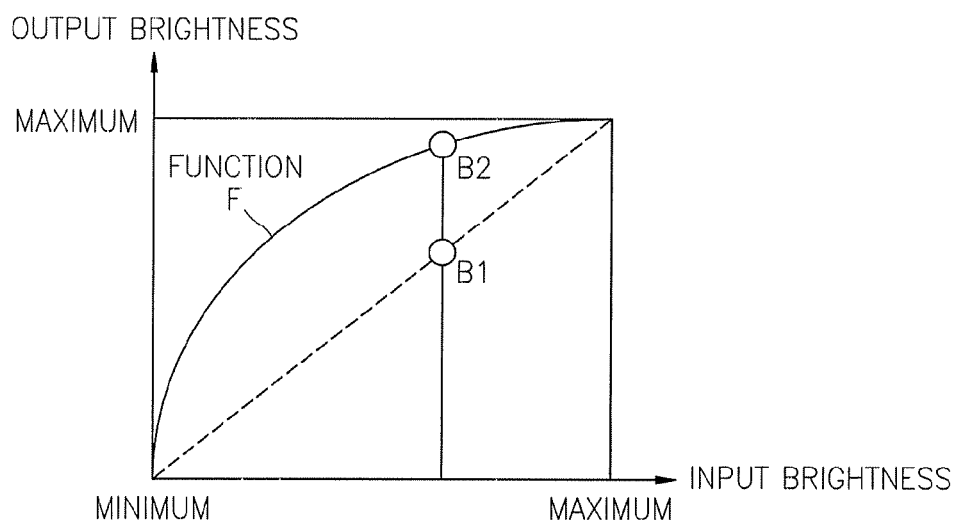
FIG. 8 is a first graph showing an increase in the brightness of an image according to the present invention.

FIG. 8 is a first graph showing a brightness increment obtained according to the present invention. Referring to FIG. 8, a function F is expressed as in Equation 3:

$$F(x) = g1 \times (x \div x\_\text{max})^{Gval} + g2 \qquad (3)$$

wherein g1 denotes a scale constant, g2 denotes an offset constant, Gval denotes a constant representing an involution, x denotes the brightness Y, and x_max denotes the maximum brightness Y, which corresponds to white if R, G, and B are all maximum.

Referring to FIG. 8, the dotted diagonal line denotes an inclination of 1, the function F, which is a nonlinear function, denotes the reference brightness Ref_Y, a circle B1 denotes the brightness Y of the original input signal (or pixel), and a circle B2 denotes the reference brightness Ref_V produced by the function F. That is, the circle B1 is Y, and the circle B2 is Ref_V.

Figure 9:
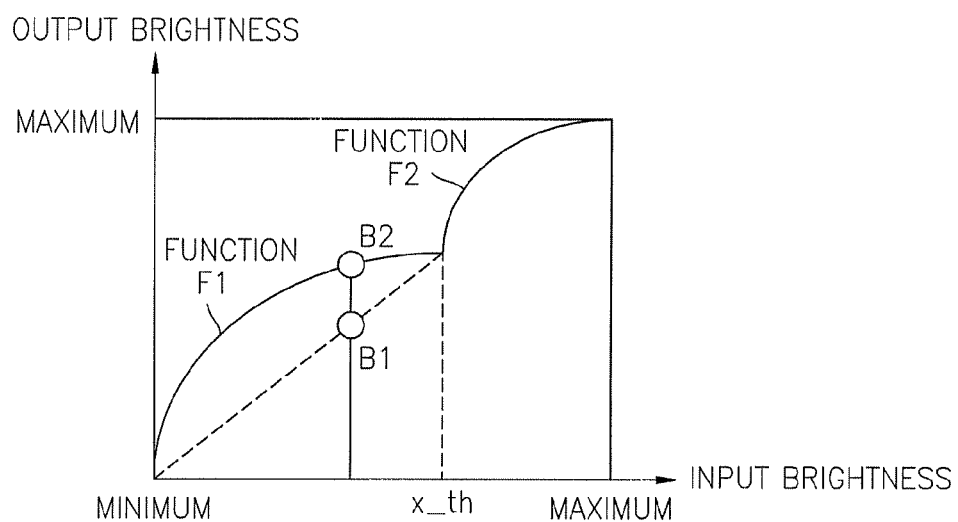
FIG. 9 is a second graph showing an increase in the brightness of an image according to the present invention.

FIG. 9 is a second graph showing a brightness increment obtained according to the present invention. The function F(x) of FIG. 9 is composed of two nonlinear functions and expressed as in Equation 4:

$$\text{if } x > x\_\text{th}, F1(x) = g1 \times (x \div x\_\text{max})^{Gval1} + g21 \text{ else,}$$
$$F2(x) = g12 \times (x \div x\_\text{max})^{Gval2} + g22 \qquad (4)$$

wherein x_th denotes a boundary value to divide a brightness section, g11 denotes the scale constant of the first brightness section, g21 denotes the offset constant of the first brightness section, and Gval1 denotes the involution value of the first brightness section. Also, g12 denotes the scale constant of the second brightness section, g22 denotes the offset constant of the second brightness section, and Gval2 denotes the involution value of the second brightness section.

Referring to FIG. 9, functions F1 and F2, which are nonlinear functions, denote the reference brightness Ref_Y, a circle Bi denotes the brightness Y of the original input signal (or pixel), and a circle B2 denotes the reference brightness Ref_V produced by the function F1. That is, B2 is Ref_V.

If the number of used nonlinear functions is m, the function F(x) is expressed as in Equation 5:

$$\text{if } x > x\_\text{th}(k) \text{ and } x \leq x\_\text{th}(k-1) F(x,k) = g1(k) \times$$
$$(x \div x\_\text{max})^{Gval(k)} + g2(k) \text{ } (1 < k < m) \qquad (5)$$

wherein k denotes a designator designating a section, g1(k) denotes the scale constant of a k section, g2(k) denotes the offset constant of the k section, and Gval(k) denotes the involution in the k section. The function F(x) expressed by Equation 5 is not shown in FIG. 9.

Figure 10:
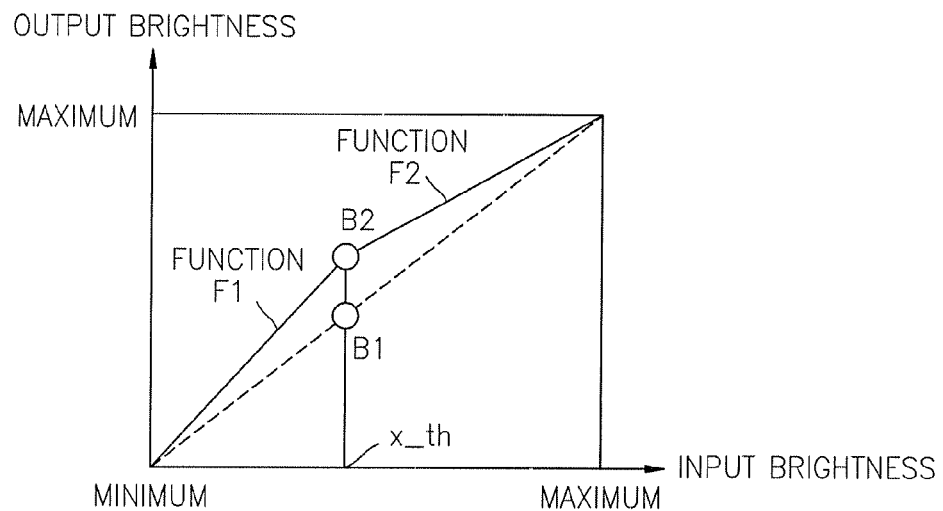
FIG. 10 is a third graph showing an increase in the brightness of an image according to the present invention.

FIG. 10 is a third graph showing a brightness increment obtained according to the present invention. The function F(x) of FIG. 10, which is another example of the function F(x) used in the present invention, is composed of linear functions and expressed as in Equation 6:

$$\text{if } x > x\_\text{th}(k) \text{ and } x < x\_\text{th}(k-1), F(x,k) = s1(k) \times x + s2(k)$$
$$(1 < k < m) \qquad (6)$$

wherein k denotes a designator for designating a section, si denotes a straight-line inclination, and s2 denotes an offset constant. Also, functions F1 and F2, which are linear functions, denote the reference brightness Ref_Y, a circle Bi denotes the brightness Y of the original input signal (or pixel), and a circle B2 denotes the reference brightness Ref_V produced by the function F1. That is, B2 is Ref_V.

Figure 11:
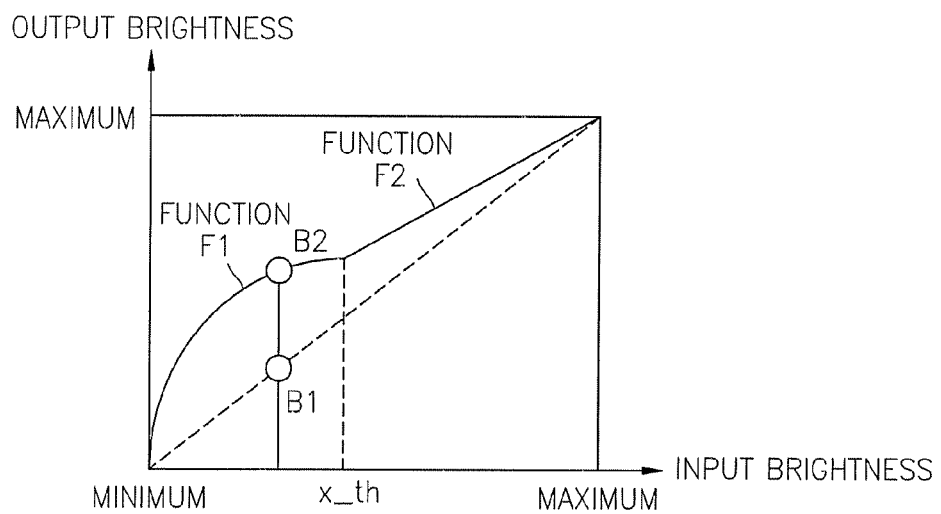
FIG. 11 is a fourth graph showing an increase in the brightness of an image according to the present invention.

FIG. 11 is a fourth graph showing a brightness increment obtained according to the present invention. The function shown in FIG. 11 is composed of the linear function F2 and the nonlinear function Fl. Here, Bi is Y, and B2 is Ref_Y.

Figure 12:
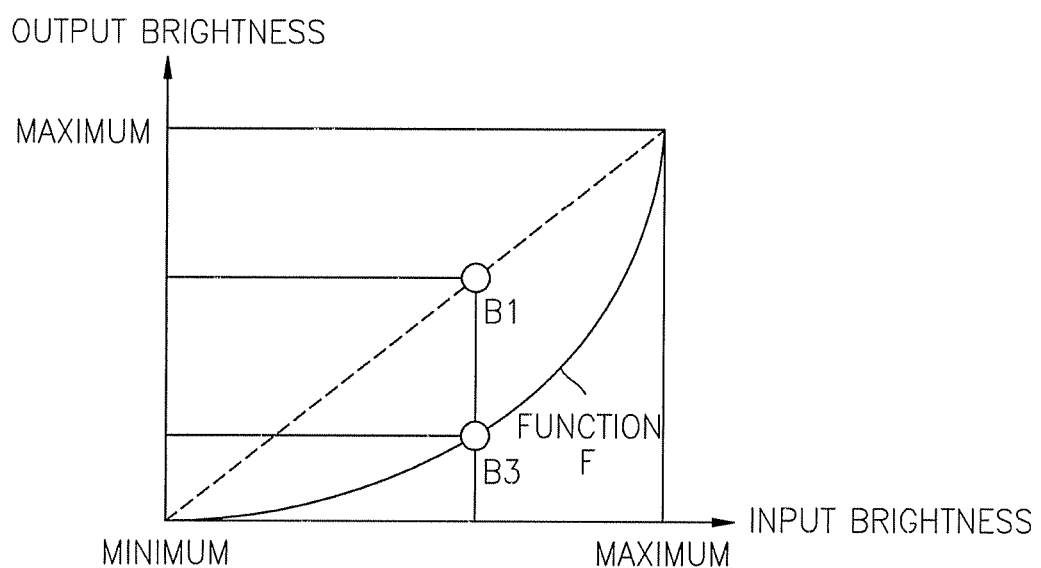
FIG. 12 is a fifth graph showing an increase in the brightness of an image according to the present invention.

FIG. 12 is a fourth graph showing a brightness increment obtained according to the present invention. The function shown in FIG. 12 is the function F given by Equation 3 when g1 is 1, g2 is 0, and Y_Gval is greater than 1. The function of FIG. 12 can be used to decrease the brightness of an input image. In FIG. 12, a circle B1 denotes the brightness Y of the original input pixel, and a circle B3 denotes the reference brightness Ref_Y obtained by using the function F.

The functions F of FIGS. 8 through 12 are functions used to explain embodiments of the present invention, so the functions according to the present invention will not be limited to the functions F of FIGS. 8 through 12.

Referring back to FIG. 5, the brightness difference arithmetic unit 40 calculates a brightness difference dif_Y expressed by Equation 7, in step 430:

$$\text{dif}\_Y = \text{Ref}\_Y - Y \qquad (7)$$

That is, the brightness difference arithmetic unit 40 calculates the difference between B2 and B1.

With reference to Equations 3 and 7, if the involution Gval is equal to or less than 1, the reference brightness Ref_Y with respect to the brightness Y increases. If the involution Gval is close to 0, the brightness difference dif_Y increases. Consequently, the brightness difference dif_Y is controlled in response to the involution Gval.

After step 430, the brightness increment arithmetic unit 50 calculates the brightness increment Inc_Y in response to the output signal of the channel selector 51 and the brightness difference dif_V output from the brightness difference arithmetic unit 40 using Equation 8, in step 440:

$$\text{Inc}\_Y = \text{dif}\_Y \div (\text{Max}\_\text{Vector}) \qquad (8)$$

wherein Max_Vector denotes the unit vector of a maximum signal (or component) out of the red, green, and blue signals Ri, Gi, and Bi constituting an input signal (or pixel). In this case, the brightness difference dif_Y denotes the brightness increment Inc_Y for each of the R, G, and B signals (or components).

After step 440, the RGB increment arithmetic unit 60 calculates the increments Inc_R, Inc_G, and Inc_B of the red, green, and blue signals Ri, Gi, and Bi constituting the input signal (or pixel) in response to the brightness increment Inc_Y output from the brightness increment arithmetic unit 50 and the unit vectors R_vec, G_vec, and B_vec output from the R-, G-, and B-channel unit vector arithmetic units 61, 63 and 65, in step 450. The increments Inc_R, Inc_G, and Inc_B are expressed as in Equation 9:

$$Inc\_R=Inc\_Y*R\_vec \; Inc\_G=Inc\_Y*G\_vec \\ Inc\_B=Inc\_Y*B\_vec \; R\_vec=b1*Ri/M1 \\ G\_vec=b1*Gi/M1 \; B\_vec=b1*Bi/M1 \; M1= \\ (Ri*Ri+Gi*Gi+Bi*Bi)^{1/2} \quad (9)$$

wherein b1 denotes a scale constant, and R_vec, G_vec, and B_vec denote the unit vectors of the red, green, and blue signals Ri, Gi, and Bi, respectively.

After step 450, the adder 70 adds the red, green, and blue signals Ri, Gi, and Bi to the increments Inc_R, Inc_G, and Inc_B output from the RGB increment arithmetic unit 60, respectively, to obtain the brightness-increased R, G, and B signals Ro, Go, and Bo, in steps 460 and 470. The R, G, and B signals Ro, Go, and Bo are expressed as in Equation 10:

$$Ro=Ri+Inc\_R \; Go=Gi+Inc\_G \; Bo=Bi+Inc\_B \quad (10)$$

The brightness-increased R, G, and B signals Ri, Gi, and Bi are the sum of the R signal Ri and the brightness increment Inc_R, the sum of the G signal Gi and the brightness increment Inc_G, and the sum of the B signal Bi and the brightness increment Inc_B, respectively. Accordingly, the image brightness controlling apparatus 100 according to the first embodiment of the present invention can maintain the sense of color, such as the original hue and chroma, while increasing the brightness of an input signal.

Also, the brightness increments of the output signals Ro, Go, and Bo do not exceed the maximum brightness. Accordingly, the output signals Ro, Go, and Bo do not exceed their respective maximum values on an RGB space.

Figure 6:
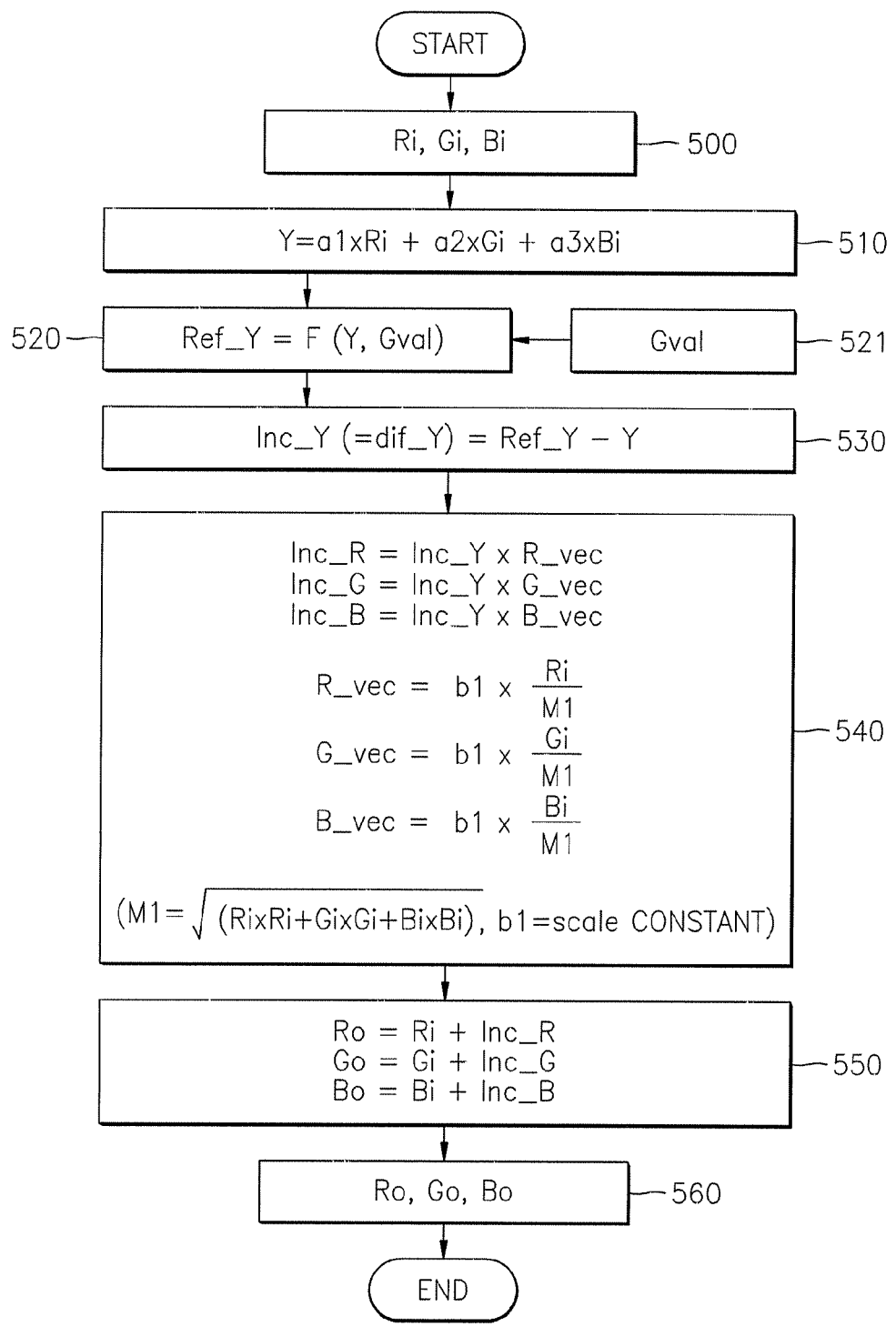
FIG. 6 is a flowchart for illustrating an image brightness controlling method according to the second embodiment of the present invention.

FIG. 6 is a flowchart for illustrating an image brightness controlling method according to a second embodiment of the present invention. Since FIG. 6 is similar to FIG. 5, only the features of FIG. 6 will now be described in detail.

In the image brightness controlling method with reference to FIGS. 3 and 6, first of all, the brightness arithmetic unit 110 receives an input signal composed of a red, green, and blue signals Ri, Gi, and Bi, in step 500. Next, the brightness arithmetic unit 110 calculates the brightness Y of the input signal in response to the red, green, and blue signals Ri, Gi, and Bi constituting the input signal as shown in Equation 11, in step 510:

$$Y=a1 \times Ri+a2 \times Gi+a3 \times Bi \quad (11)$$

wherein a1, a2 and a3 denote constants representing the weights of R, G, and B signals, respectively, constituting an input signal. The reference value arithmetic unit 20 obtains the reference brightness Ref_Y in response to the brightness Y output from the brightness arithmetic unit 110 using Equation 2, in step 520.

In response to the brightness Y of the input signal and the reference brightness Ref_Y, the brightness increment arithmetic unit 130 obtains the brightness difference dif_Y between the brightness Y of the input signal and the reference brightness Ref_Y using Equation 12, in step 530:

$$Inc\_Y(=dif\_Y)=Ref\_Y-Y \quad (12)$$

In this case, the brightness difference dif_Y is the brightness increment Inc_Y.

Thereafter, the RGB increment arithmetic unit 60 calculates the increments Inc_R, Inc_G, and Inc_B of the red, green, and blue signals Ri, Gi, and Bi in response to the brightness increment Inc_Y output from the brightness increment arithmetic unit 50 and the unit vectors R_vec, G_vec, and B_vec output from the R-, G-, and B-channel unit vector arithmetic units 61, 63 and 65, in step 540.

Next, the adder 70 adds the red, green, and blue signals Ri, Gi, and Bi to the increments Inc_R, Inc_G, and Inc_B, respectively, to obtain the brightness-increased R, G, and B signals Ro, Go, and Bo, in steps 550 and 560. The signals Ro, Go, and Bo output from the adder 70 are expressed as in aforementioned Equation 10.

Figure 7:
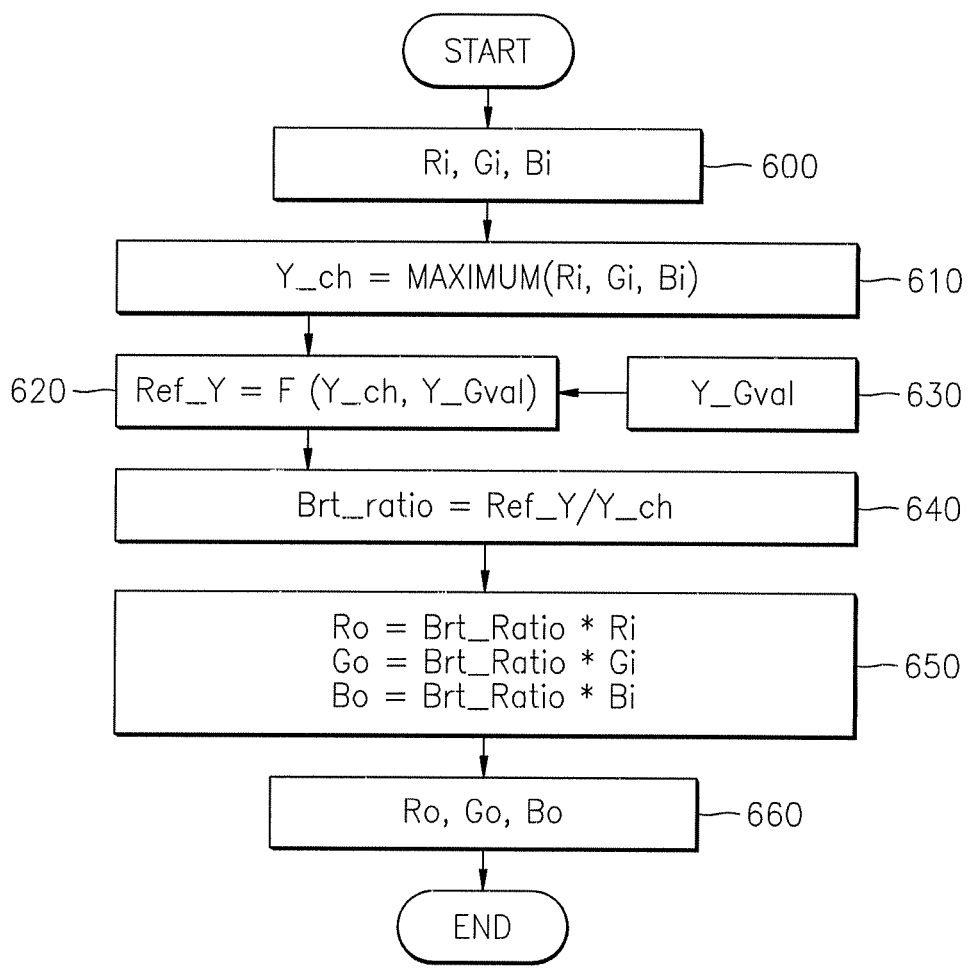
FIG. 7 is a flowchart for illustrating an image brightness controlling method according to the third embodiment of the present invention.

FIG. 7 is a flowchart illustrating an image brightness controlling method according to a third embodiment of the present invention. In this image brightness controlling method with reference to FIGS. 4 and 7, first of all, images signals Ri, Gi, and Bi are input to the brightness parameter arithmetic unit 145, in step 600.

A brightness parameter representing the brightness of an input signal is required to improve the brightness within a color gamut in which the input signals Ri, Gi, and Bi can express colors. The brightness parameter can be obtained by a plurality of methods. The first method is determining, as the brightness parameter, the value of the maximum component out of the three signals (components) Ri, Gi, and Bi on an RGB color space. That is, the brightness parameter arithmetic unit 145 obtains the brightness parameter Y_ch using aforementioned Equation 1, in step 610.

The second method to obtain the brightness parameter is obtaining the brightness parameter using aforementioned Equation 11. The third method is using the nonlinear Equation 13:

$$L = q1 * \left(\frac{Y}{Y\max}\right)^{q2} - q3 \quad (13)$$

wherein q1 denotes a scale constant, q3 denotes an offset value, q2 denotes an involution, and Y denotes the linear brightness of the input signals Ri, Gi, and Bi. The brightness Y can be the brightness Yc. Ymax denotes the maximum brightness, and L denotes the nonlinear brightness of the input signals Ri, Gi, and Bi. On an internal standard color space, CIE L*, q1 is 116, q2 is ⅓, and q3 is 16.

After step 610, the reference value arithmetic unit 20 obtains the reference brightness Ref_Y, in step 620. At this time, the brightness improvement parameter Y_Gval is received as a control signal, in step 630. The reference brightness is expressed as in aforementioned Equation 2. The function F in Equation 2 is a function of the brightness Y_ch (or Yc or L). FIGS. 8 through 12 show examples of the function F of Equation 2. In contrast with the functions of FIGS. 8 through 11, the function shown in FIG. 12 is the function F of Equation 3 when g1 is 1, g2 is 0, and Y_Gval is greater than 1. The function of FIG. 12 can be used to decrease the brightness of an input image. In FIG. 12, a circle B1 denotes the brightness Y of the original input pixel, and a circle B3 denotes the reference brightness Ref_Y obtained using the function F.

After step 620, the brightness improvement ratio divider 140 obtains the brightness improvement ratio Brt_ratio between the brightness Y_ch of the input pixel and the reference brightness Ref_Y, in step 640. The brightness improvement ratio Brt_ratio of an input pixel is obtained using Equation 14:

$$Brt\_ratio = Ref\_Y/Y\_ch \qquad (14)$$

After step 640, the RGB multiplier 150 multiplies the brightness improvement ratio obtained in step 640 by each of the R, G, and B components for the input pixel to obtain a brightness-improved output pixel, in step 650. The multiplication is as expressed in Equation 15:

$$Ro = Brt\_ratio * Ri\ Go = Brt\_ratio * Gi\ Bo = Brt\_ratio * Bi \qquad (15)$$

Ref_V of Equation 14 is a value within the color gamut in the RGB color space, and the brightness improvement ratio Brt_ratio of the maximum component among the RGB components is also within the color gamut. Accordingly, when the values of the other two components equal to or smaller than that of the maximum component are multiplied by the brightness improvement ratio Brt_ratio, they also fall within the color gamut.

After step 650, obtained brightness-improved signals Ro, Go, and Bo are output from the RGB multiplier 150, in step 660.

Brightness improvement parameters, such as g1, g2 and Y_Gval shown in Equation 3, are required. The values of the brightness improvement parameters can be controlled by users.

Figure 13:
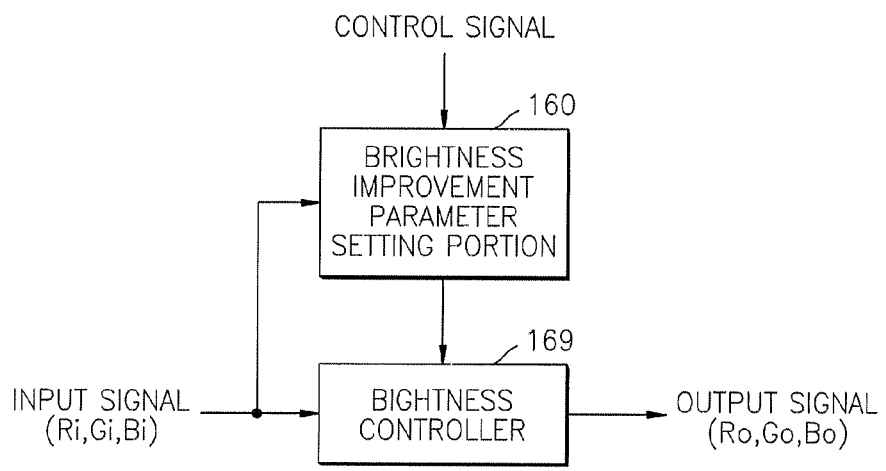
FIG. 13 is a block diagram of an apparatus for adaptively controlling the brightness of an image according to the brightness degree of an image, according to the present invention.

FIG. 13 is a block diagram of an apparatus for adaptively controlling the brightness of an image depending on the brightness degree of an image, according to the present invention. This apparatus includes a brightness improvement parameter setting portion 160 and a brightness controller 169.

Figure 18:
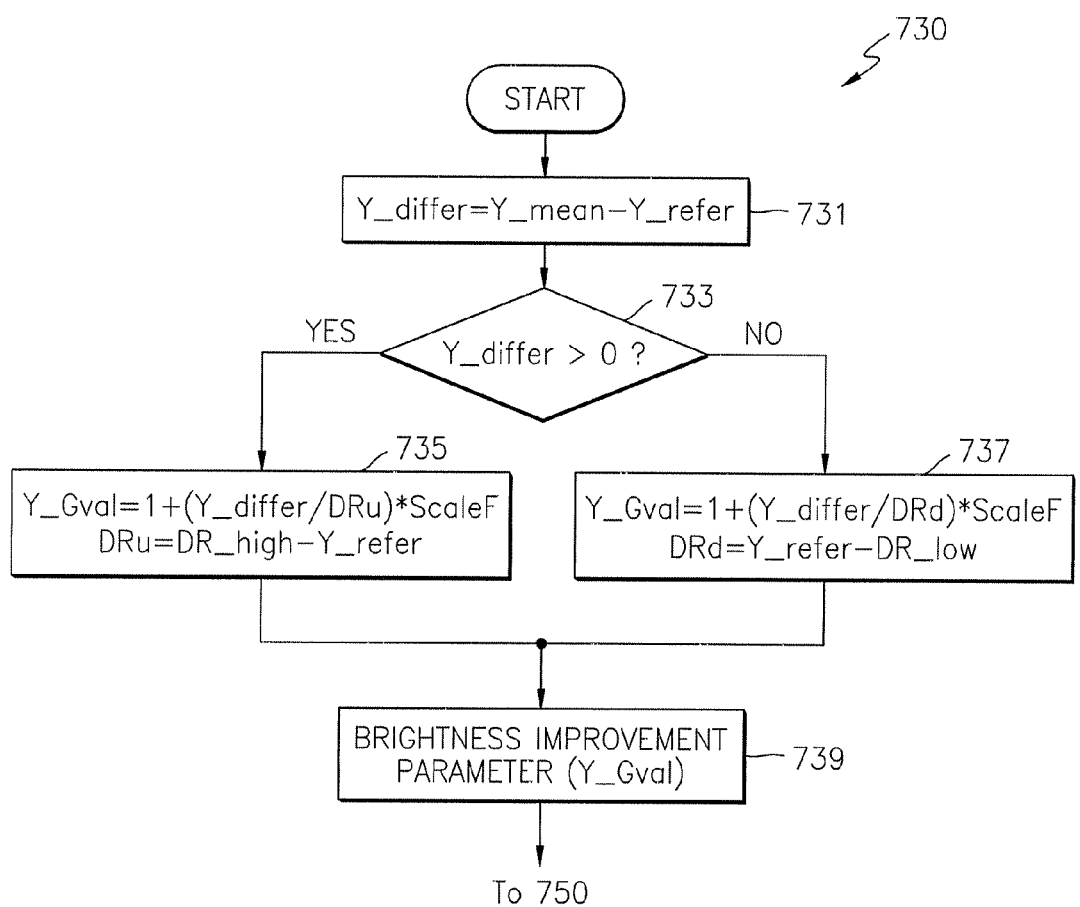
FIG. 18 is a detailed flowchart of step 730 shown in FIG. 16.

The brightness improvement parameter setting portion 160 receives an image signal (Ri+Gi+Bi) and a control signal including a scale value necessary for brightness improvement and calculates a brightness improvement parameter. The control signal can be a reference average brightness (Y_refer), DR_high, DR_low, ScaleFu, or ScaleFd, and will be described in more detail later when FIG. 18 is described.

The brightness controller 169 receives a brightness improvement parameter Y_Gval from the brightness improvement parameter setting portion 160 and controls the brightness of the image signal according to the brightness improvement parameter Y_Gval to obtain an improved luminance signal. The brightness controller 169 can be one of the brightness controllers 100, 200, and 300 in FIGS. 2, 3, and 4.

Figure 14:
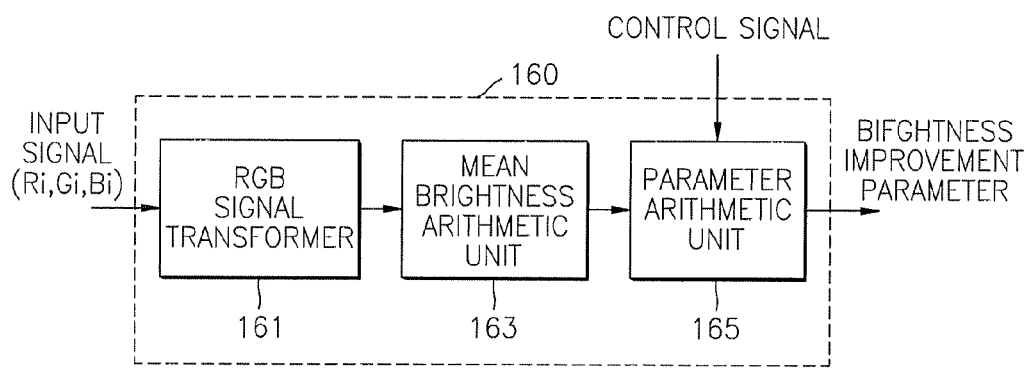
FIG. 14 is a detailed block diagram of the brightness improvement parameter setting portion 160 of FIG. 13.

FIG. 14 is a detailed block diagram of the brightness improvement parameter setting portion 160 including an RGB signal transformer 161, a mean brightness arithmetic unit 163, and a parameter arithmetic unit 165.

The RGB signal transformer 161 receives the image signal (Ri+Gi+Bi), transforms it into a luminance signal Y, and outputs the luminance signal Y to the mean brightness arithmetic unit 163. However, if a luminance signal Y, Cb, or Cr is input instead of an RGB image signal, the RGB signal transformer 161 is not required.

The mean brightness arithmetic unit 163 obtains the mean brightness of the luminance signal Y and outputs it to the parameter arithmetic unit 165. If an image is processed one frame at a time, the brightness values of frames are averaged.

The parameter arithmetic unit 165 receives the mean brightness from the mean brightness arithmetic unit 163 and a control signal including a scale value necessary for brightness improvement, calculates the brightness improvement parameter Y_Gval, and outputs the same to the brightness controller 169.

Figure 15:
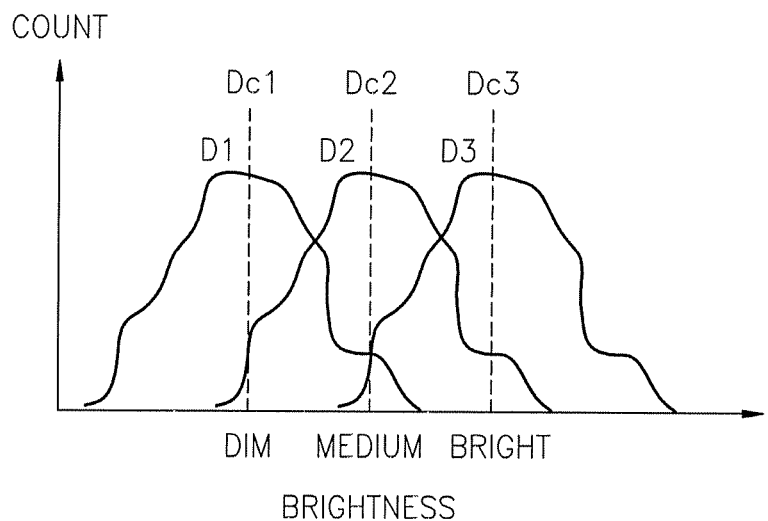
FIG. 15 is a graph showing the brightness histograms of three images having different brightness degrees.
Figure 16:
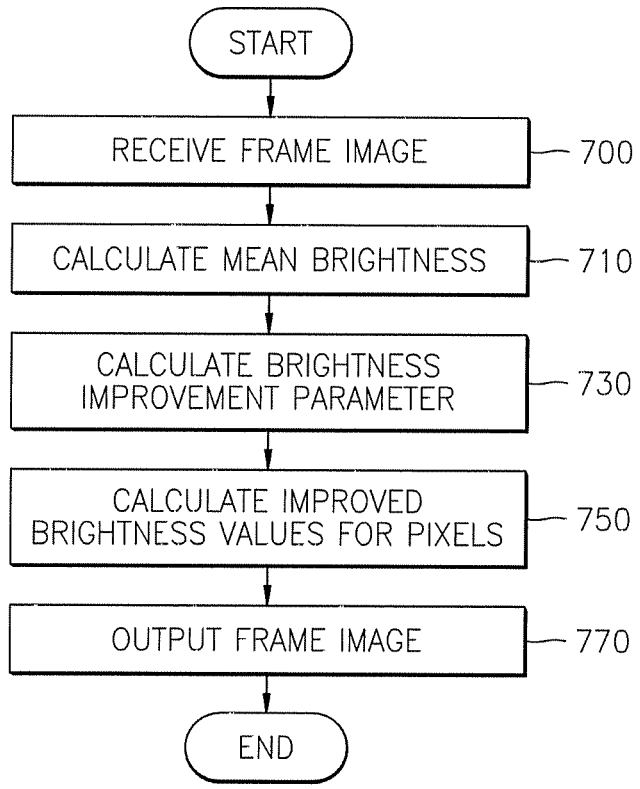
FIG. 16 is a flowchart for illustrating a method of adaptively controlling the brightness of an image according to the brightness degree of an image, according to the present invention.

FIG. 16 is a flowchart for illustrating a method of adaptively controlling the brightness of an image depending on the brightness degree of an image, according to the present invention. Referring to FIGS. 13 through 16, it will be described how to adaptively increase the brightness of an image depending on the brightness degree of an input signal (Ri+Gi+Bi).

A representative parameter representing the brightness degree of an image is the mean brightness of an image. FIG. 15 shows the brightness histograms of three images having different brightness degrees. In FIG. 15, a dim image is indicated by D1, an image having a medium brightness is indicated by D2, and a bright image is indicated by D3. The mean brightness values representing the brightness degrees of the images D1, D2 and D3 are indicated by Dc1, Dc2, and Dc3, respectively.

With reference to FIG. 16, first of all, a frame image is input to the brightness improvement parameter 160 and the brightness controller 169, in step 700.

The mean brightness arithmetic unit 163 calculates the mean brightness of the received frame image, in step 710.

The parameter arithmetic unit 165 receives the mean brightness from the mean brightness arithmetic unit 163 and calculates the brightness improvement parameter Y_Gval according to a control signal, in step 730.

The brightness controller 169 calculates improved brightness values for pixels in response to the brightness improvement parameter and the received image, in step 750. the improved brightness values can be calculated by methods as shown in FIGS. 5 through 7.

The brightness controller 169 output the improved brightness values, in step 760.

Figure 17:
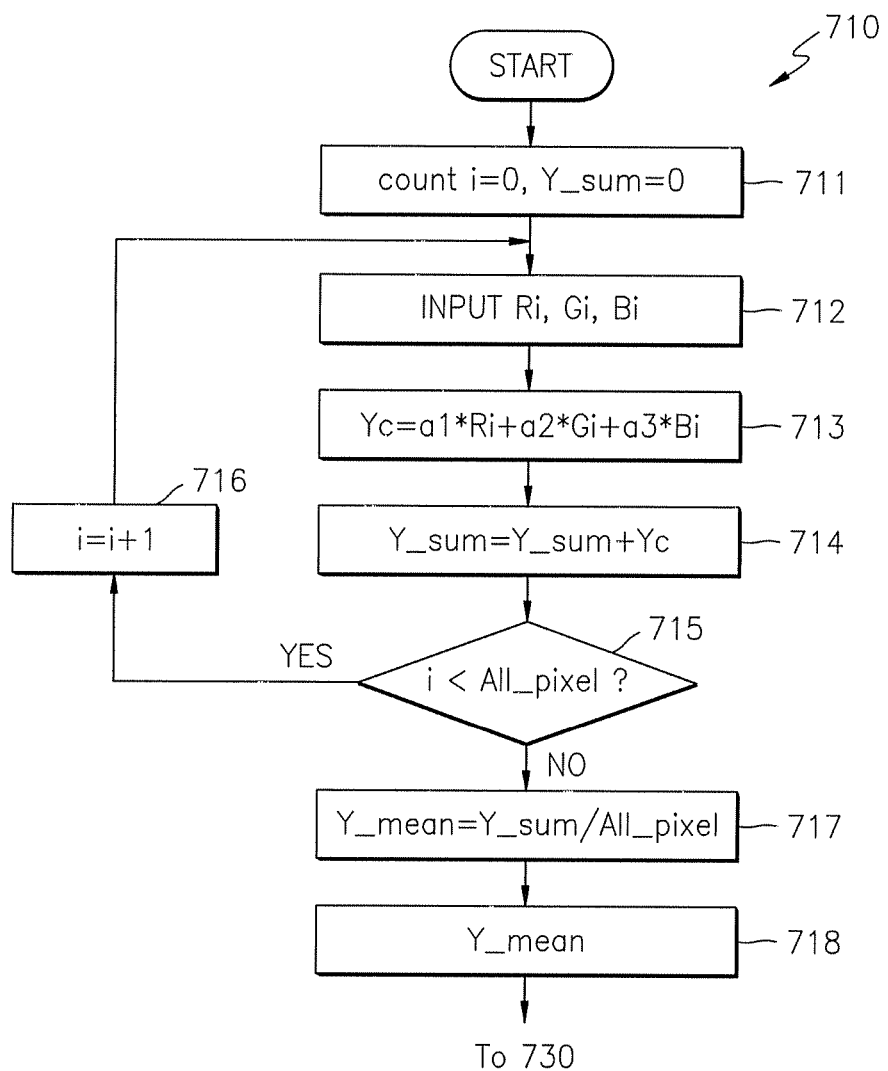
FIG. 17 is a detailed flowchart of step 710 shown in FIG. 16.

FIG. 17 is a detailed flowchart of step 710, which is performed in the mean brightness arithmetic unit 163 of FIG. 14. The mean brightness Y_mean of an image is expressed as in Equation 16:

$$Y\_mean = \frac{1}{N} \sum_{i=0}^{N-1} Yc_i \qquad (16)$$

wherein $Y_{c_i}$ denotes a brightness parameter and can be expressed as Equation 1, i denotes an index representing an arbitrary spatial coordinate within an image, and N denotes the total number of pixels of an image.

In step 710 of calculating the mean brightness of an image, first of all, index i and a brightness sum Y_sum are each set to be 0 before a frame image signal is received, in step 711. Next, pixel values Ri, Gi, and Bi constituting the frame image signal are received, in step 712.

Thereafter, the brightness value for the input pixel values Ri, Gi, and Bi at the location corresponding to the index i is calculated, in step 713. In FIG. 17, the brightness value is obtained through Equation 11. Of course, the brightness value can be calculated using Equation 1 or Equation 13.

The brightness value obtained in step 713 is added to the brightness sum Y_sum, in step 714.

It is determined whether the index i is smaller than the total number of pixels constituting the received frame image, in step 715.

If the index i is smaller than the total pixel number, the index i increases by 1, in step 716. the method goes back to step 712.

If it is determined in step 715 that the index i is equal to or greater than the total pixel number, the brightness sum Y_sum is divided by the total pixel number to obtain the mean brightness Y_mean of the received image, in step 717.

FIG. 18 is a detailed flowchart of step 730 shown in FIG. 16. The step 730 is performed in the parameter arithmetic unit 165 of FIG. 14. The step 730 of calculating the brightness improvement parameter Y_Gval will now be described in detail with reference to FIG. 18.

First of all, the mean brightness difference Y differ between the mean brightness Y_mean obtained in step 710 and the reference mean brightness Y_refer is obtained, in step 731. The reference mean brightness Y_refer serving as the basis of the mean brightness is used to determine whether to increase or decrease the brightness depending on the mean brightness Y_mean of an image. The reference mean brightness is the mean brightness when an increase or decrease in the brightness of an image is not needed. Accordingly, if the input mean brightness is smaller than the reference mean brightness, an increase in the brightness of an image is required. If the input mean brightness is greater than the reference mean brightness, a decrease in the brightness of an image is required. The increase or decrease in the brightness of an image can be achieved using the gamma exponent Gval of Equation 3 as the brightness improvement parameter.

After step 731, if it is determined in step 733 that the mean brightness difference Y differ is positive, the brightness improvement parameter Y_Gval is calculated using Equation 17, in step 735:

$$Y\_Gval = G\_def + \{(Y\_mean - Y\_refer)/(DR\_high - Y\_refer)\} * ScaleFu \quad (17)$$

If it is determined in step 733 that the mean brightness difference Y_differ is negative, the brightness improvement parameter Y_Gval is calculated using Equation 18, in step 737:

$$Y\_Gval = G\_def + \{(Y\_mean - Y\_refer)/(Y\_ref - DR\_low)\} * ScaleFd \quad (18)$$

In Equations 17 and 18, G_def denotes the reference value of the brightness improvement parameter Y_Gval that is the gamma exponent of the reference mean brightness value. DR_high denotes the maximum allowable value of the mean brightness of an image, and DR_low denotes the minimum allowable value of the mean brightness of an image. ScaleFu and ScaleFd, which are scale factors, denote values representing the maximum and minimum allowable ranges, respectively, of the gamma exponent. In a preferred embodiment of the present invention, G_def can be set to be 1, Y_refer can be set to be 168, DR_high can be set to be 250, DR_low can be set to be 50, and ScaleFu and ScaleFd can be both set to be 0.5. The reference mean brightness (Y_refer), DR_high, DR_low, ScaleFu, and ScaleFd are used as the control signal applied to the brightness improvement parameter setting portion 160 of FIG. 13 and can be adjusted by a user or a chip maker.

Figure 19:
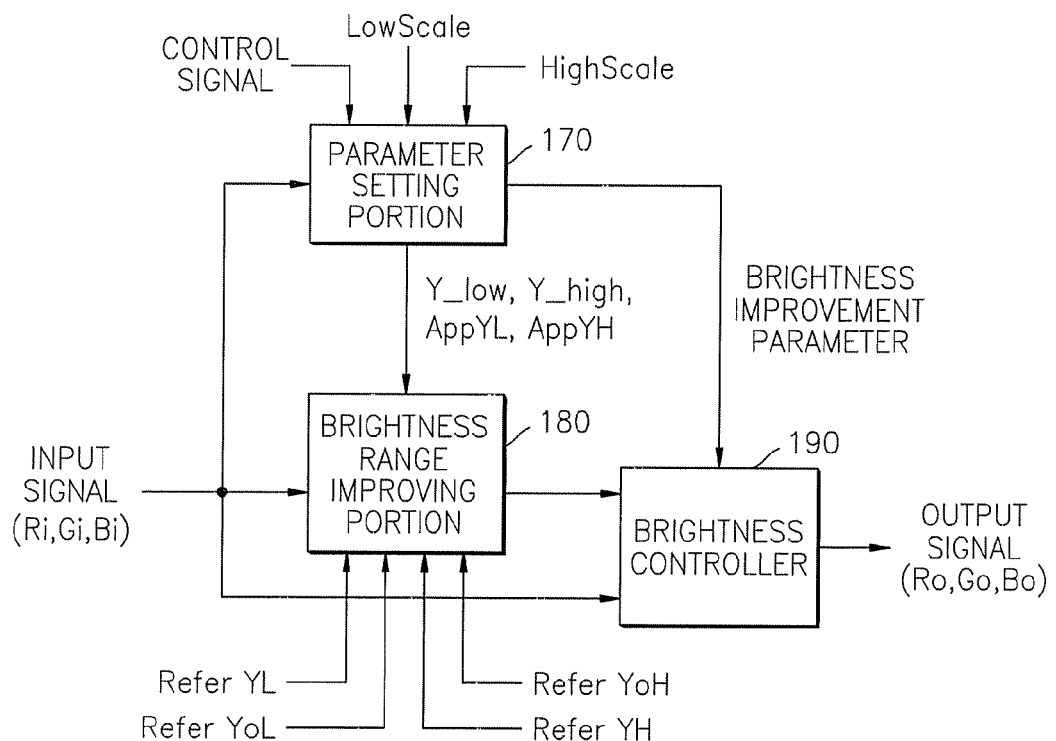
FIG. 19 is a block diagram of an apparatus for adaptively controlling the brightness of an image according to the brightness range of an image or the brightness range and brightness degree of an image, according to the present invention.

FIG. 19 is a block diagram of an apparatus for adaptively controlling the brightness of an image based on the brightness range of an image or the brightness range and brightness degree of an image, according to the present invention. This apparatus includes a parameter setting portion 170, a brightness range improving portion 180, and a brightness controller 190.

The parameter setting portion 170 receives an image signal (Ri+Gi+Bi), a control signal including a scale value necessary for brightness improvement, a control signal LowScale including the minimum scale value of the brightness range, and a control signal HighScale including the maximum scale value of the brightness range. The control signal including a scale value necessary for brightness improvement is the same as the control signal applied to the brightness improvement parameter setting portion 160 of FIG. 13. That is, the control signal including a scale value necessary for brightness improvement can be one of the reference mean brightness Y_refer, the maximum allowable value DR_high, the minimum allowable value DR_low, the maximum allowable range value ScaleFu, and the minimum allowable range value ScaleFd. Depending on the existence or nonexistence of the control signal applied to the brightness improvement parameter setting portion 160 or the control signals including the scale values of the brightness range, the adaptive image brightness controlling apparatus of FIG. 19 adaptively controls the brightness of an image. In other words, the adaptive image brightness controlling apparatus of FIG. 19 adaptively controls the brightness of an image depending on the brightness range, or the brightness degree, or both the brightness range and the brightness degree.

The parameter setting portion 170 outputs a brightness improvement parameter to the brightness controller 190 and also outputs 4 types of brightness range improvement parameters to the brightness range improving portion 180. Here, the four brightness range improvement parameters are the minimum brightness value Y_low of the received image signal, the maximum brightness value Y_high of the received image signal, the minimum value AppYL of an extended brightness range, and the maximum value AppYH of the extended brightness range.

The brightness range improving portion 180 receives the four brightness range improvement parameters Y_low, Y_high, AppYL, and AppYH from the parameter setting portion 170, and also receives brightness range parameters, that is, a reference brightness range maximum value ReferYH, a reference brightness range minimum value ReferYL, the reference brightness range maximum value ReferYoH of the extended brightness range, and the reference brightness range minimum value ReferYoL of the extended brightness range, from a micomputer MICOM (not shown). The brightness range improving portion 180 also receives the image signal (Ri+Gi+Bi), improves the brightness ranges of individual pixels, and outputs a signal having an improved brightness range to the brightness controller 190.

The brightness controller 190 receives the brightness improvement parameter from the parameter setting portion 170, and also receives the signal having an improved brightness range from the brightness range improving portion 180. Then, the brightness controller 190 calculates the brightness improvements of individual pixels for the image signal (Ri+Gi+Bi) to obtain a brightness-improved signal (Ro+Go+Bo).

Figure 20:
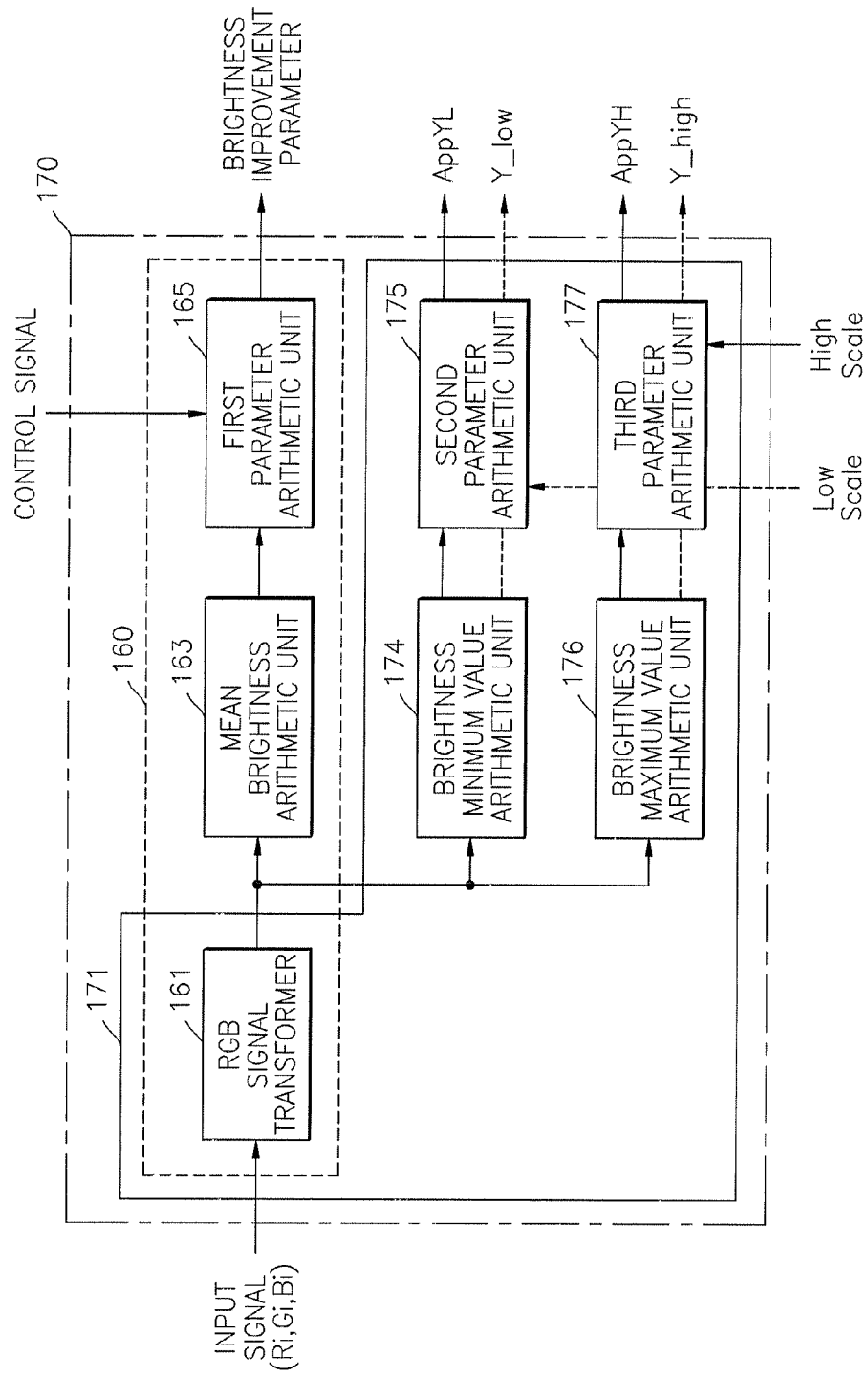
FIG. 20 is a detailed block diagram of the parameter setting portion 170 of FIG. 19.

FIG. 20 is a detailed block diagram of the parameter setting portion 170 of FIG. 19. The parameter setting portion 170 includes the brightness improvement parameter setting portion 160 of FIG. 14 and a brightness range improvement parameter setting portion 171. The brightness range improvement parameter setting portion 171 includes an RGB signal transformer 161, a brightness minimum value arithmetic unit 174, a brightness maximum value arithmetic unit 176, a second parameter arithmetic unit 175, and a third parameter arithmetic unit 177.

Since the brightness improvement parameter setting portion 160 is described above, only the brightness range improvement parameter setting portion 171 will now be described in detail.

As described above, the RGB signal transformer 161 transforms an input image signal into a luminance signal if the input image signal is an RGB signal, and outputs the luminance signal to the brightness minimum value arithmetic unit 174 and the brightness maximum value arithmetic unit 176. Hence, if the input image signal is a signal other than an RGB signal, the RGB signal transformer 161 is not required.

The brightness minimum value arithmetic unit 174 obtains the minimum brightness value Y_low and outputs it to the second parameter arithmetic unit 175 and the brightness range improving portion 180.

The second parameter arithmetic unit 175 receives the minimum brightness value Y_low and the control signal LowScale including the minimum brightness range scale value, calculates the applied brightness minimum value parameter AppYL, and outputs it to the brightness range improving portion 180.

The brightness maximum value arithmetic unit 176 obtains the maximum brightness value Y_high and outputs it to the third parameter arithmetic unit 177 and the brightness range improving portion 180.

The third parameter arithmetic unit 177 receives the maximum brightness value Y_high and the control signal HighScale including the maximum brightness range scale value, calculates the applied brightness maximum value parameter AppYH, and outputs it to the brightness range improving portion 180.

Figure 21A:
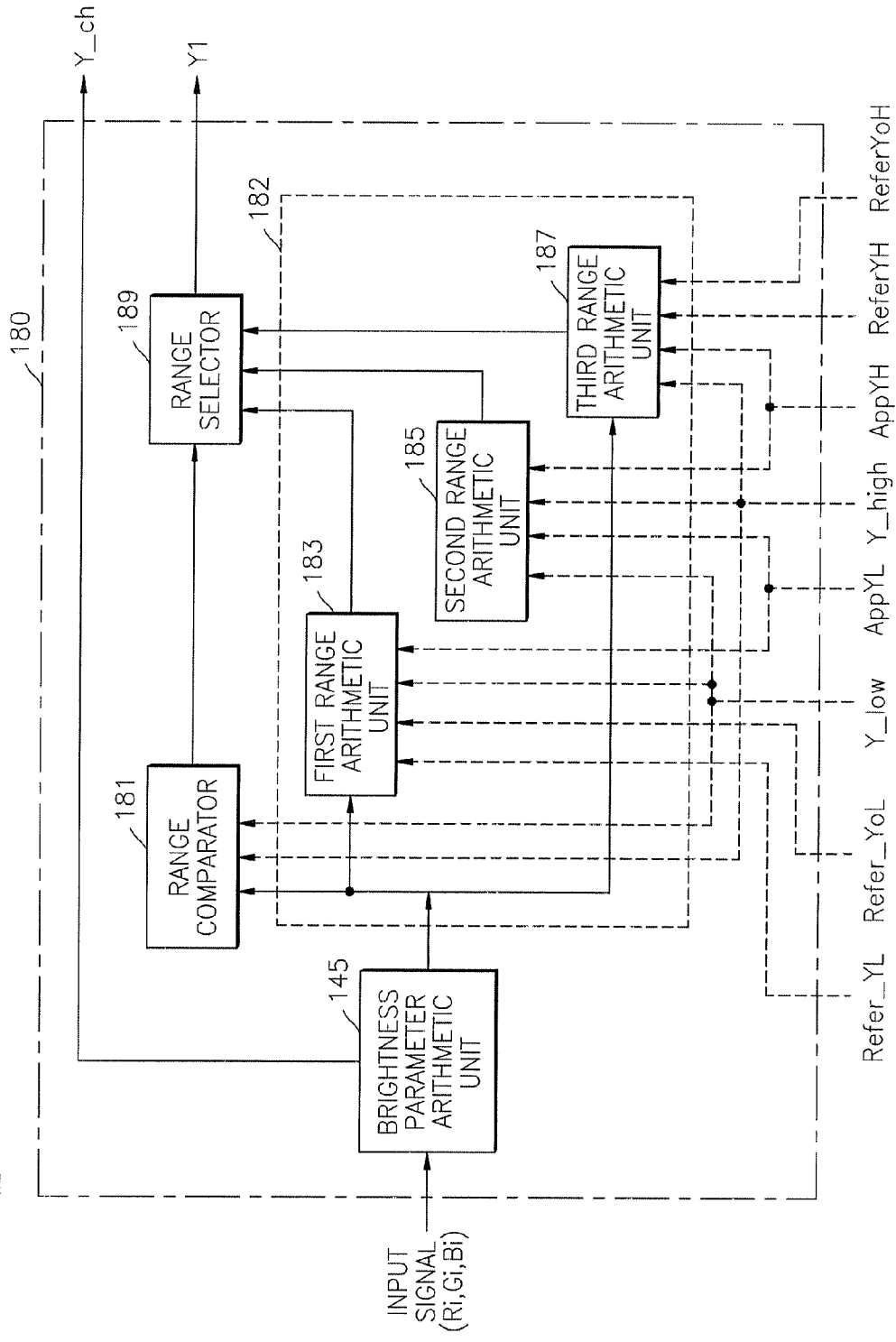
FIGS. 21A and 21B are block diagrams of the brightness range improving portion 180 of FIG. 19.
Figure 21B:
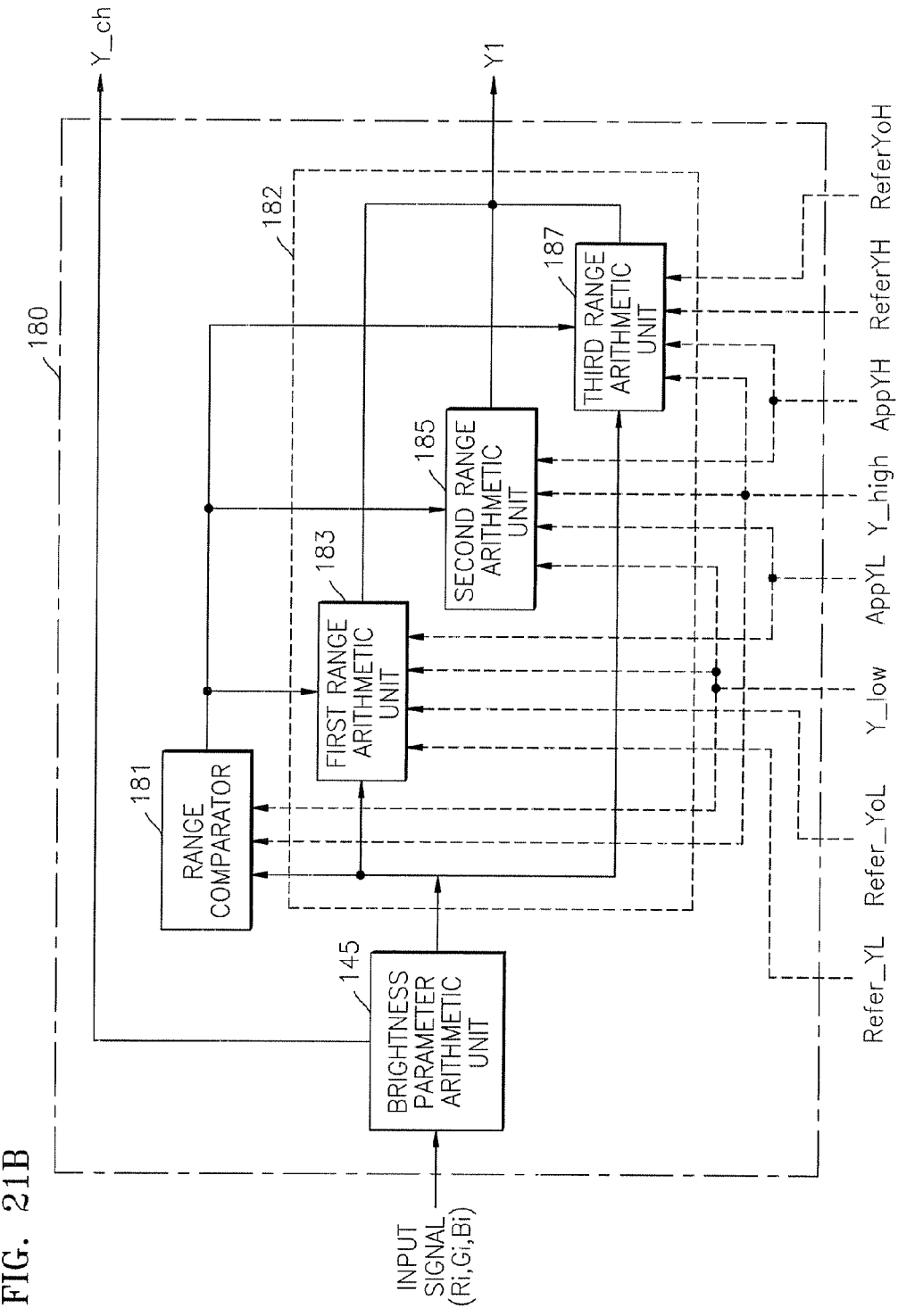

FIGS. 21A and 21B are block diagrams of the brightness range improving portion 180 of FIG. 19. Referring to FIG. 21A, the brightness range improving portion 180 includes a brightness parameter arithmetic unit 145, a range comparator 181, a range selector 189, and a brightness signal arithmetic unit 182. The brightness signal arithmetic unit 182 includes a first range arithmetic unit 183, a second range arithmetic unit 185, and a third range arithmetic unit 187.

The brightness parameter arithmetic unit 145 is as described above, so it will not be described in detail. The brightness parameter Y_ch output from the brightness parameter arithmetic unit 145 is applied to the brightness controller 190, the range comparator 181, the first range arithmetic unit 183, the second range arithmetic unit 185, and the third range arithmetic unit 187.

The range comparator 181 receives the brightness parameter Y_ch from the brightness parameter arithmetic unit 145 and also receives the minimum and maximum values Y_low and Y_high of the range of a section in an input image from the parameter setting portion 170. The range comparator 181 checks whether the brightness parameter Y_ch is smaller than the minimum value Y_low, between the minimum and maximum values Y_low and Y_high, or is greater than the maximum value Y_high in order to determine which section the brightness parameter belongs to, and then outputs the information on the determined section to the range selector 189.

The first range arithmetic unit 183 receives the brightness parameter Y_ch from the brightness parameter arithmetic unit 145. The first range arithmetic unit 183 also receives the minimum brightness value Y_low of the input image signal, and the minimum value AppYL of an extended brightness range from the parameter setting portion 170, and the reference brightness range minimum value ReferYL, and the reference brightness range minimum value ReferYoL of the extended brightness range from the MICOM (not shown). Thereafter, the first range arithmetic unit 183 calculates a brightness range improvement value with respect to the brightness parameter Y_ch and outputs it to the range selector 189.

The second range arithmetic unit 185 receives the brightness parameter Y_ch from the brightness parameter arithmetic unit 145. The second range arithmetic unit 185 receives the values Y_low, Y_high, AppYL, and AppYH from the parameter setting portion 170, calculates a brightness range improvement value with respect to the brightness parameter Y_ch and outputs it to the range selector 189.

The third range arithmetic unit 187 receives the brightness parameter Y_ch from the brightness parameter arithmetic unit 145. The third range arithmetic unit 187 also receives the values Y_high and AppYH from the parameter setting portion 170, and the reference brightness range maximum value ReferYH and the reference brightness range maximum value ReferYoH of the extended brightness range from the micom (not shown). Thereafter, the third range arithmetic unit 187 calculates a brightness range improvement value with respect to the brightness parameter Y_ch and outputs it to the range selector 189.

The range selector 189 selects a signal corresponding to the section information received from the range comparator 181 among the signals received from the first, second, and third range arithmetic units 183, 185, and 187 and outputs a brightness range-extended luminance signal Y1 to the brightness controller 190.

Referring to FIG. 21B, the brightness range improving portion 180 includes a brightness parameter arithmetic unit 145, a range comparator 181, and a brightness signal arithmetic unit 182. The brightness signal arithmetic unit 182 includes a first range arithmetic unit 183, a second range arithmetic unit 185, and a third range arithmetic unit 187. Since the brightness range improving section of FIG. 21B is similar to that of FIG. 21A, only featuring parts will now be described in detail.

The range comparator 181 applies the section information to each of the first, second, and third range arithmetic units 183, 185, and 187, and enables a range arithmetic unit corresponding to the determined section among of the three range arithmetic units while disabling the other two range arithmetic units. Accordingly, the brightness range-extended luminance signal Y1 is output to the brightness controller 190.

Figure 22:
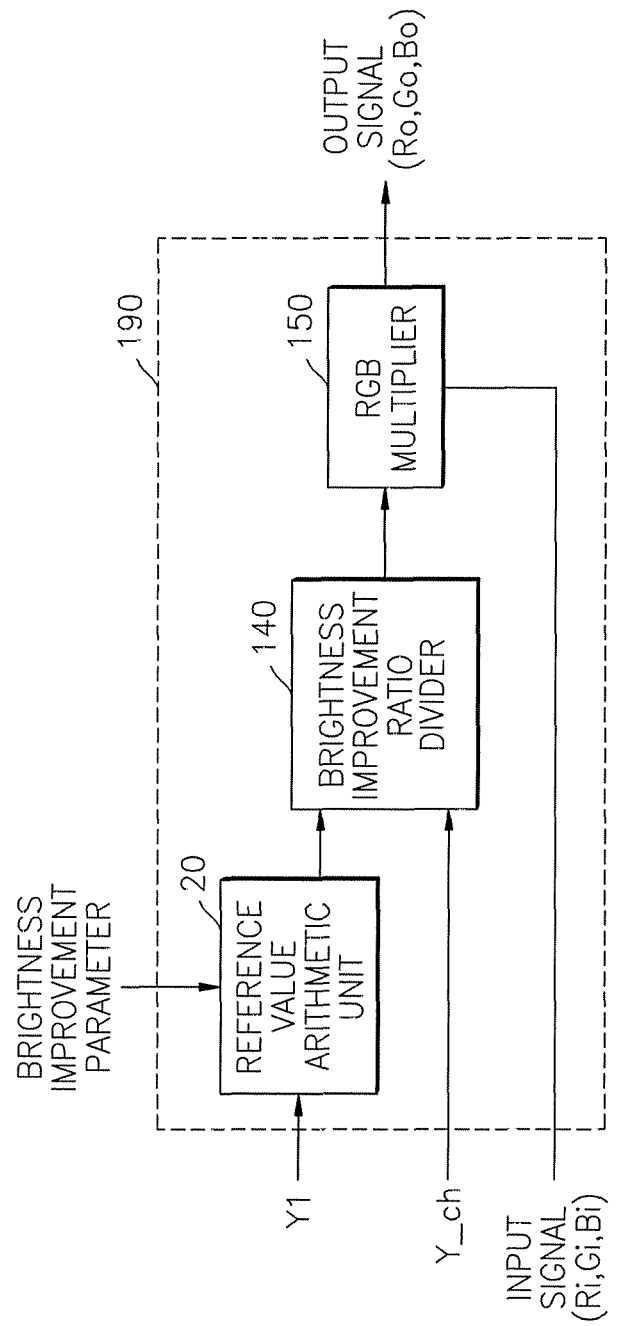
FIG. 22 is a block diagram of the brightness controller 190 of FIG. 19.

FIG. 22 is a block diagram of the brightness controller 190 of FIG. 19. The brightness controller 190 includes a reference value arithmetic unit 20, a brightness improvement ratio divider 140, and an RGB multiplier 150. the brightness controller 190 of FIG. 19 is the same as the image brightness controlling apparatus of FIG. 4 except that the brightness parameter arithmetic unit 145 is not included. Hence, only the featuring parts will now be described in detail.

Unlike the reference value arithmetic unit 20 of FIG. 4 receiving the brightness parameter Y_ch from the brightness parameter arithmetic unit 145, the reference value arithmetic unit 20 of FIG. 22 receives the brightness range-improved luminance signal Y1 from the brightness range improving portion 180 and calculates the reference brightness Ref_Y. The use of the brightness range-improved luminance signal Y1 as the parameter x of the function F expressed as in Equation 3 enables adaptive image brightness control based on the brightness range of an image.

Figure 23:
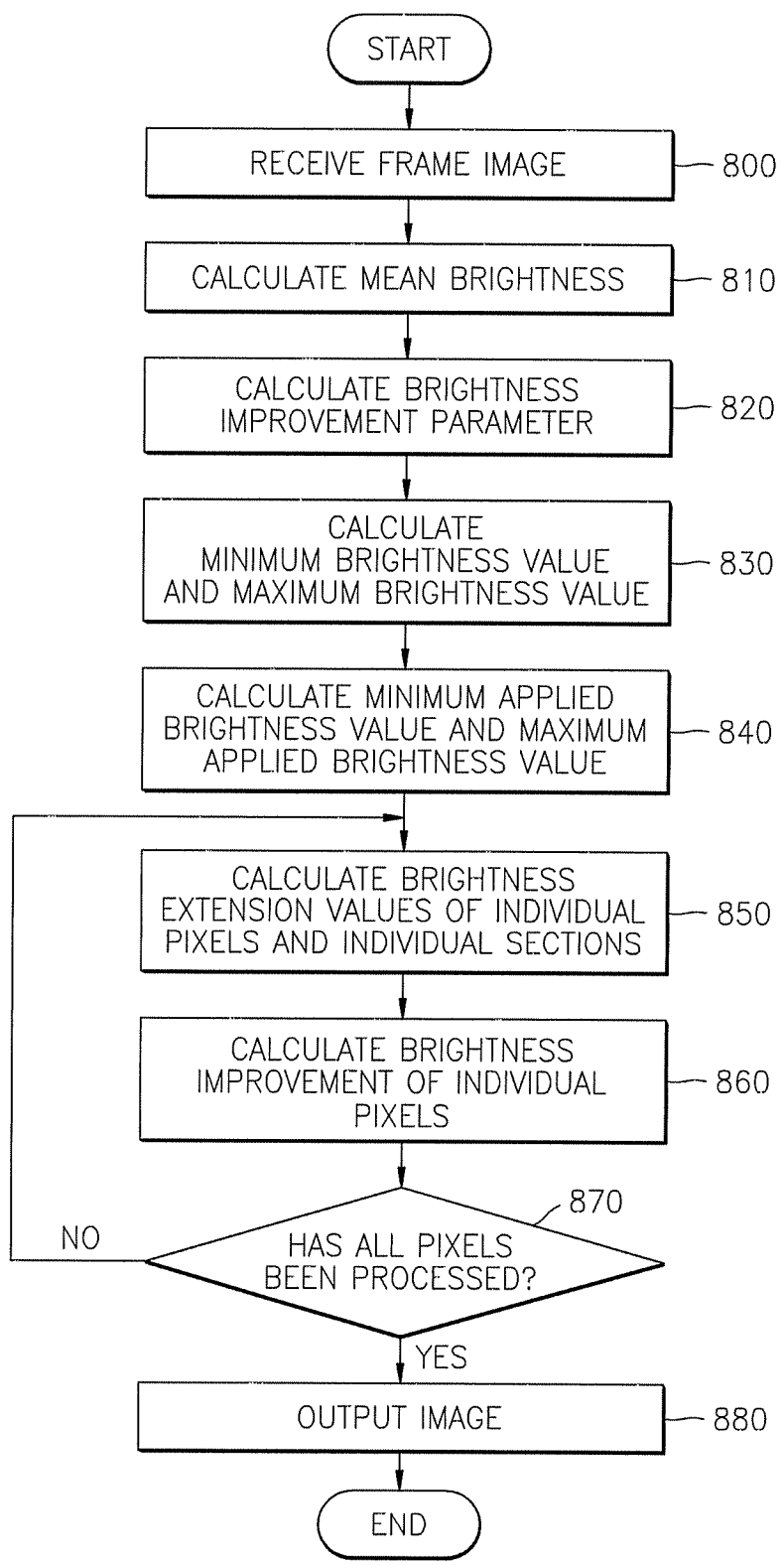
FIG. 23 is a flowchart for illustrating a method of adaptively controlling the brightness of an image based on the brightness range of an image or the brightness range and brightness degree of an image, according to the present invention.

FIG. 23 is a flowchart for illustrating a method of adaptively controlling the brightness of an image based on the brightness range of an image or both the brightness range and brightness degree of an image, according to the present invention. The brightness range Y_DR of an image is expressed as in Equation 19:

$$Y\_DR = Y\_high - Y\_low \qquad (19)$$

wherein Y_high denotes the maximum brightness value among the brightness values of an image, and Y_low denotes the minimum brightness value among the brightness values of an image. The values Y_high and Y_low can be set as brightness values positioned at higher 10% and lower 10% of the total number of pixels, respectively.

The fact that the contrast of an image is high means that the value Y_DR is high.

The reference value arithmetic unit 20 of FIGS. 4 and 22 calculates the reference brightness value Ref_Y expressed as in Equations 2 and 3 to be used to improve the brightness of an input image. If the brightness range-extended brightness Y1 instead of the brightness parameter Y_ch of the input image is used as the parameter of the function F, an output image whose brightness is improved depending on the brightness range of the input image can be obtained. In addition, the calculation of the brightness improvement parameter Y_Gval for use in brightness control using the method described through FIGS. 16 through 18 enables both adaptive brightness control based on the brightness range and adaptive brightness control based on the brightness degree of an image.

Referring to FIGS. 19 through 23, in the adaptive image brightness controlling method, first, a frame image is input to the parameter setting portion 170, the brightness range improving portion 180, and the brightness controller 190, in step 800.

The mean brightness arithmetic unit 163 obtains the brightness Y_mean of the received frame image, in step 810. The mean brightness Y_mean can be obtained by the method of FIG. 7.

The parameter arithmetic unit 165 calculates the brightness improvement parameter Y_Gval from the mean brightness Y_mean, in step 820. The brightness improvement parameter Y_Gval can be calculated by the method of FIG. 18.

The brightness minimum value arithmetic unit 174 and the brightness maximum value arithmetic unit 176 calculate the minimum brightness range value Y_low and the maximum brightness range value Y_high, respectively, in step 830. The minimum and maximum brightness range values Y_low and Y_high can be the maximum and minimum brightness values, respectively, among the brightness values of an image. In the brightness histogram introduced in the embodiments of the present invention, the minimum and maximum brightness range values Y_low and Y_high are set as the brightness values positioned at the upper 10% and lower 10% of the total number of pixels, respectively.

The first and second parameter arithmetic units 175 and 177 calculate the minimum and maximum applied brightness range values AppYL and AppYH, respectively, in step 840. The reference brightness range is required to extend the brightness range of an image. The reference brightness range maximum value ReferYH and the reference brightness range minimum value ReferYL are used as the reference brightness range. When the brightness range values Y_high and Y_low of the input image are calculated, the increment of a brightness range is determined using the values expressed as in Equations 20 and 21:

$$AppYL = Y\_low - (Y\_low - ReferYL)*LowScale \quad (20)$$

$$AppYH = Y\_high + (ReferYH - Y\_high)*HighScale \quad (21)$$

wherein AppYL and AppYH denote the minimum and maximum values, respectively, of an extended brightness range to be applied to an image, and LowScale and HighScale denote parameters for controlling the degree of extension of a brightness range. For example, the values LowScale and HighScale are both set to be 0.3, the value ReferYL is set to be 1, and the value ReferYH is set to be 255.

After step 840, the brightness range improving portion 180 calculates the brightness range extended signal Y1 in which the brightness range of individual sections and individual pixels is extended, in step 850. Here, the brightness parameters belong to image sections.

The brightness controller 190 calculates the brightness improvement values of individual pixels using the brightness improvement parameter Y_Gval, in step 860. The brightness improvement values can be obtained by the methods of FIGS. 5 through 7.

Steps 850 and 860 repeat until all of the pixels within the received frame are processed, in step 870.

Figure 24:
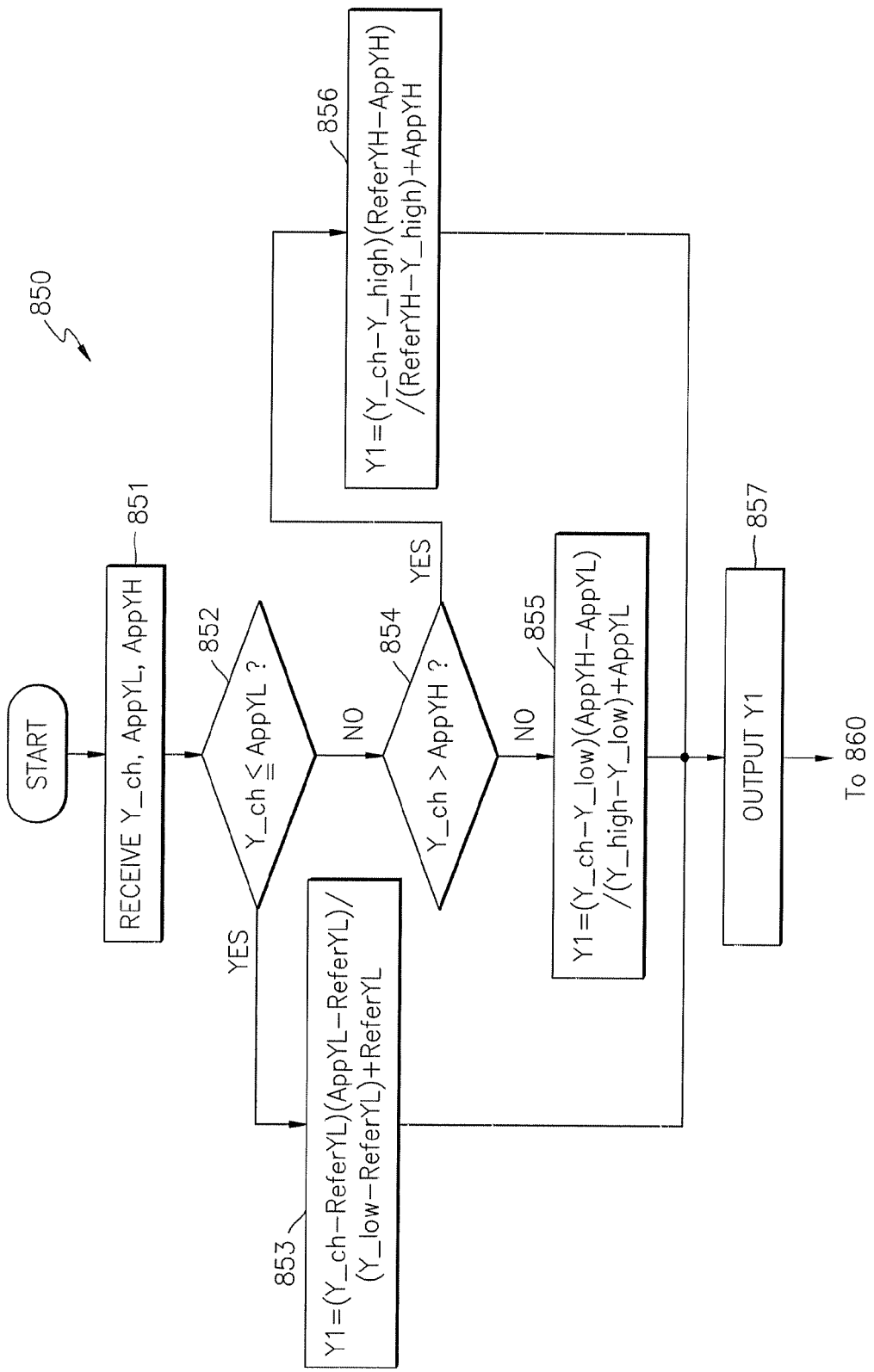
FIG. 24 is a flowchart for illustrating step 850 of FIG. 23.

FIG. 24 is a flowchart for illustrating step 850 of FIG. 23 in greater detail. Referring to FIGS. 19, 21A, 21B, and 24, first of all, the brightness parameter Y_ch, the applied brightness minimum value AppYL, and the applied brightness maximum value AppYH are applied to the range comparator 181, in step 851.

It is determined whether the brightness parameter Y_ch is smaller than the applied brightness minimum value AppYL, in step 852.

If the brightness parameter Y_ch is smaller than the applied brightness minimum value AppYL, the first range arithmetic unit 183 obtains the brightness range extended luminance signal Y1 using Equation 22, in step 853:

$$Y\_ch <= Y\_low, \; Y1 = (Y\_ch - ReferYL)*(AppYL - ReferYL)/(Y\_low - ReferYL) + ReferYL \quad (22)$$

On the other hand, if the brightness parameter Y_ch is equal to or greater than the applied brightness minimum value AppYL, it is determined whether the brightness parameter Y_ch is greater than the applied brightness maximum value AppYH, in step 854.

If the brightness parameter Y_ch is smaller than or equal to the applied brightness maximum value AppYH, the second range arithmetic unit 185 obtains the brightness range extended luminance signal Y1 using Equation 23, in step 855:

$$Y\_high > Y\_ch > Y\_low, \; Y1 = (Y\_ch - Y\_low)*(AppYH - AppYL)/(Y\_high - Y\_low) + AppYL \quad (23)$$

On the other hand, if the brightness parameter Y_ch is greater than the applied brightness maximum value AppYH, the third range arithmetic unit 187 obtains the brightness range extended luminance signal Y1 using Equation 24, in step 856:

$$Y\_high <= Y\_ch, \; Y1 = (Y\_ch - Y\_high)*(ReferYH - AppYH)/(ReferYH - Y\_high) + AppYH \quad (24)$$

After each of the steps 853, 855, and 856, the brightness range extended luminance signal Y1 is output to the brightness controller 190, in step 857.

The invention can also be embodied as computer readable codes on a computer readable recording medium. The computer readable recording medium is any data storage device that can store data which can be thereafter read by a computer system. Examples of the computer readable recording medium include read-only memory, random-access memory, CD-ROMs, magnetic tapes, floppy disks, and optical data storage devices, and so on. Also, the computer readable codes can be transmitted via a carrier wave such as Internet. The computer readable recording medium can also be distributed over a network coupled computer systems so that the computer readable code is stored and executed in a distributed fashion.

As described above, in an image brightness controlling apparatus and an image brightness controlling method according to the present invention, the brightness of an image entirely or partially increases while maintaining the original sense of color. In an apparatus and method of adaptively controlling the brightness of an image based on the brightness degree of the image, according to the present invention, the brightness of the entire image or part of the image adaptively increases based on the brightness degree of the image while maintaining the original sense of color. In an apparatus and method of adaptively controlling the brightness of an image based on the brightness range and/or brightness degree of the image, according to the present invention, the brightness of the entire image or part of the image adaptively increases depending on the brightness range and/or brightness degree of the image while maintaining the original sense of color.

What is claimed is:

1. An image brightness controlling apparatus comprising:
    a brightness improvement parameter setting unit configured to receive an input image signal and a control signal, the brightness improvement parameter setting unit comprising
        a mean brightness arithmetic unit configured to calculate using a non-linear function a mean brightness of the input image signal comprised of elements; and
        a parameter arithmetic unit configured to set a brightness improvement parameter for determining a degree of an increase or decrease in the brightness of an image based on the input image signal, the mean brightness of the input image signal, and the control signal including a scale value needed for brightness improvement, the scale value comprising a minimum and maximum allowable range of a gamma exponent of a reference mean brightness,
        wherein when the mean brightness of the input image signal is determined as being smaller than the reference mean brightness, a first brightness improvement parameter for increasing the brightness of the image is calculated based on the scale value comprising the maximum allowable range of the gamma exponent and when the mean brightness is determined as being greater than the reference mean brightness, a second brightness improvement parameter for decreasing the brightness of the image is calculated based on the scale value comprising the minimum allowable range of the gamma exponent; and
    a brightness controller configured to control the brightness of the image in response to the brightness improvement parameter and the input image signal.

2. The image brightness controlling apparatus of claim 1, further comprising an RGB signal transformer for transforming the input image signal into a luminance signal if the input image signal is an RGB signal.

3. The image brightness controlling apparatus of claim 1, wherein the brightness controller comprises: a brightness parameter arithmetic unit for outputting a brightness parameter for the input image signal; a reference value arithmetic unit for outputting a reference brightness value for the output brightness parameter; a brightness improvement ratio divider for dividing the reference brightness value by the brightness parameter output from the brightness parameter arithmetic unit to obtain a brightness improvement ratio; and an individual element multiplier for multiplying each of the elements constituting the input image signal by the brightness improvement ratio.

4. The image brightness controlling apparatus of claim 3, wherein the brightness parameter arithmetic unit determines as the brightness parameter the value of the maximum element among the elements constituting the input image signal.

5. The image brightness controlling apparatus of claim 3, wherein the reference value arithmetic unit calculates the reference brightness value corresponding to the brightness parameter output from the brightness parameter arithmetic unit using reference brightness value functions corresponding to a received control signal.

6. The image brightness controlling apparatus of claim 1, wherein the parameter arithmetic unit calculates the brightness improvement parameter in response to the mean brightness and the control signal.

7. The image brightness controlling apparatus of claim 6, wherein the parameter arithmetic unit calculated the brightness improvement parameter by comparing the mean brightness with a reference brightness.

8. The image brightness controlling apparatus of claim 1, wherein the mean brightness arithmetic unit obtains brightness values for each of the elements using the non-linear function, obtains a brightness sum by summing the brightness values for each of the elements and calculates the mean brightness of the input image signal based on the obtained brightness sum.

9. The image brightness controlling apparatus of claim 8, wherein the mean brightness arithmetic unit calculates the mean brightness of the input image by dividing the brightness sum by a quantity of the elements.

10. An adaptive image brightness controlling method comprising:
    inputting an input image signal and a control signal to a brightness improvement parameter setting unit;
    calculating using a non-linear function a mean brightness of the input image signal comprised of elements;
    setting a brightness improvement parameter for determining a degree of an increase or decrease in the brightness of an image based on the input image signal, the mean brightness of the input image signal, and the control signal including a scale value needed for brightness improvement, the scale value comprising a minimum and maximum allowable range of a gamma exponent of a reference mean brightness, wherein when the mean brightness of the input image signal is determined as being smaller than the reference mean brightness, a first brightness improvement parameter for increasing the brightness of the image is calculated based on the scale value comprising the maximum allowable range of the gamma exponent and when the mean brightness is determined as being greater than the reference mean brightness, a second brightness improvement parameter for decreasing the brightness of the image is calculated based on the scale value comprising the minimum allowable range of the gamma exponent; and
    controlling the brightness of the image in response to the brightness improvement parameter and the input image signal.

11. The adaptive image brightness controlling method of claim 10, further comprising transforming the input image signal into a luminance signal if the input image signal is an RGB signal.

12. The adaptive image brightness controlling method of claim 10, wherein the brightness controlling step comprises: determining a brightness parameter for the input image signal; calculating a reference brightness value for the output brightness parameter; dividing the reference brightness value by the calculated brightness parameter to obtain a brightness improvement ratio; and multiplying each of the elements constituting the input image signal by the brightness improvement ratio.

13. The adaptive image brightness controlling method of claim 12, wherein, in the brightness parameter calculation step, the value of the maximum element among the elements constituting the input image signal is determined as the brightness parameter.

14. The image brightness controlling method of claim 12, wherein, in the reference value calculation step, the reference brightness value corresponding to the determined brightness parameter is obtained using reference brightness value functions corresponding to a received control signal.

15. The adaptive image brightness controlling method of claim 10, wherein the brightness improvement parameter setting step comprises: calculating the brightness improvement parameter in response to the mean brightness and the control signal.

16. The adaptive image brightness controlling method of claim 15, wherein, in the brightness improvement parameter calculation step, the brightness improvement parameter is obtained by comparing the mean brightness with a reference brightness.

17. A non-transitory computer readable recording medium that stores a program for implementing an adaptive image brightness controlling method comprising:

inputting an input image signal and a control signal to a brightness improvement parameter setting unit calculating using a non-linear function a mean brightness of the input image signal comprised of elements;

setting a brightness improvement parameter for determining a degree of an increase or decrease in the brightness of an image based on the input image signal, the mean brightness of the input image signal, and the control signal including a scale value needed for brightness improvement, the scale value comprising a minimum and maximum allowable range of a gamma exponent of a reference mean brightness, wherein when the mean brightness of the input image signal is determined as being smaller than the reference mean brightness, a first brightness improvement parameter for increasing the brightness of the image is calculated based on the scale value comprising the maximum allowable range of the gamma exponent and when the mean brightness is determined as being greater than the reference mean brightness, a second brightness improvement parameter for decreasing the brightness of the image is calculated based on the scale value comprising the minimum allowable range of the gamma exponent; and controlling the brightness of the image in response to the brightness improvement parameter and the input image signal.

* * * * *